US012196372B2

(12) United States Patent
Grip et al.

(10) Patent No.: US 12,196,372 B2
(45) Date of Patent: Jan. 14, 2025

(54) TANK SYSTEM HAVING REMOVABLE PLUG ASSEMBLY AND METHOD OF USING THE SAME

(71) Applicant: The Boeing Company, Arlington, VA (US)

(72) Inventors: Robert E. Grip, Rancho Palos Verdes, CA (US); Aaron J. Kutzmann, Long Beach, CA (US)

(73) Assignee: The Boeing Company, Arlington, VA (US)

( * ) Notice: Subject to any disclaimer, the term of this patent is extended or adjusted under 35 U.S.C. 154(b) by 10 days.

(21) Appl. No.: 18/336,990

(22) Filed: Jun. 17, 2023

(65) Prior Publication Data

US 2024/0418328 A1 Dec. 19, 2024

(51) Int. Cl.
*F17C 13/12* (2006.01)
*F17C 1/12* (2006.01)

(52) U.S. Cl.
CPC ................ *F17C 13/12* (2013.01); *F17C 1/12* (2013.01); *F17C 2201/0109* (2013.01); *F17C 2203/0391* (2013.01); *F17C 2205/0311* (2013.01); *F17C 2221/012* (2013.01); *F17C 2221/033* (2013.01); *F17C 2223/0161* (2013.01); *F17C 2260/042* (2013.01); *F17C 2270/0189* (2013.01)

(58) Field of Classification Search
CPC .... F17C 13/12; F17C 1/12; F17C 2201/0109; F17C 2203/0391; F17C 2205/0311; F17C 2221/012; F17C 2221/033; F17C 2223/0161; F17C 2270/0189
See application file for complete search history.

(56) References Cited

U.S. PATENT DOCUMENTS

| | | | | |
|---|---|---|---|---|
| 4,062,288 A * | 12/1977 | Millray | B60C 29/00 | 222/3 |
| 5,386,699 A * | 2/1995 | Myers | F25J 1/0208 | 62/7 |
| 6,128,908 A * | 10/2000 | Gustafson | F17C 5/02 | 220/560.04 |
| 8,910,487 B2 * | 12/2014 | Hylands | F17C 13/084 | 62/50.7 |

* cited by examiner

*Primary Examiner* — Brian M O'Hara

(57) ABSTRACT

There is provided a tank system having a removable plug assembly. The tank system has a vacuum tank with a vacuum tank main portion, a pressure tank mounted within the vacuum tank, and a vacuum cavity formed between the pressure tank and the vacuum tank. The pressure tank has the removable plug assembly with removable plug element(s), each configured to plug and to unplug opening(s) in the pressure tank, and a retraction mechanism within the pressure tank coupled to the removable plug element(s). When an emergency condition occurs, the retraction mechanism is activated to pull the removable plug element(s) away from the opening(s) and into the interior of the pressure tank, to allow a cryogenic fluid to exit from the pressure tank, through the opening(s), and into the vacuum cavity, and when the vacuum tank has a breach, to allow the cryogenic fluid to further exit out into air.

20 Claims, 19 Drawing Sheets

TANK SYSTEM HAVING REMOVABLE PLUG ASSEMBLY AND METHOD OF USING THE SAME

CROSS-REFERENCE TO RELATED APPLICATIONS

This nonprovisional patent application is related to contemporaneously filed U.S. nonprovisional patent application Ser. No. 18/336,989, titled STRUCTURALLY INTEGRATED VACUUM TANK AND METHOD OF USING THE SAME, filed on Jun. 17, 2023, the contents of which are hereby incorporated by reference in their entirety. By mention in this CROSS-REFERENCE TO RELATED APPLICATIONS section, the application is not admitted to be prior art with respect to this application.

This nonprovisional patent application is also related to contemporaneously filed U.S. nonprovisional patent application Ser. No. 18/336,991, titled SEGMENTED VACUUM JACKETED TANK SYSTEM AND METHOD OF USING THE SAME, filed on Jun. 17, 2023, the contents of which are hereby incorporated by reference in their entirety. By mention in this CROSS-REFERENCE TO RELATED APPLICATIONS section, the application is not admitted to be prior art with respect to this application.

This nonprovisional patent application is also related to contemporaneously filed U.S. nonprovisional patent application Ser. No. 18/336,992, titled SYSTEM AND METHOD OF CONTROLLING THE CIRCUMFERENCE OF A PRESSURE TANK MOUNTED WITHIN A VACUUM TANK, filed on Jun. 17, 2023, the contents of which are hereby incorporated by reference in their entirety. By mention in this CROSS-REFERENCE TO RELATED APPLICATIONS section, the application is not admitted to be prior art with respect to this application.

This nonprovisional patent application is also related to contemporaneously filed U.S. nonprovisional patent application Ser. No. 18/336,993, titled SYSTEM AND METHOD OF CONTROLLING THE DEFLECTIONS OF A PRESSURE TANK MOUNTED WITHIN A VACUUM TANK, filed on Jun. 17, 2023, the contents of which are hereby incorporated by reference in their entirety. By mention in this CROSS-REFERENCE TO RELATED APPLICATIONS section, the application is not admitted to be prior art with respect to this application.

FIELD

The disclosure relates generally to tank systems and methods, and more particularly, to a tank system and method having a removable plug assembly to allow a cryogenic fluid to exit in an emergency condition.

BACKGROUND

Storage tank systems for storing cryogenic fluid, such as liquid hydrogen or liquid natural gas, to provide fuel power for vehicles, such as aircraft, automobiles, trucks, and other vehicles, may include vacuum jacketed tank systems. A typical vacuum jacketed tank system includes an external or outer vacuum tank, under vacuum, that houses an internal or inner pressure tank, under pressure, within the external vacuum tank. The external vacuum tank provides a vacuum jacket for the internal pressure tank. The internal pressure tank contains the cryogenic fluid, such as liquid hydrogen, liquid natural gas, or another cryogenic fluid. The vacuum jacketed tank system further includes a vacuum cavity having a sufficient gap clearance between the internal pressure tank and the external vacuum tank.

The vacuum jacketed tank system has safety considerations should the vacuum jacketed tank system experience a breach or rupture of the external vacuum tank and the internal pressure tank. Should the external vacuum tank be breached or ruptured, for example, as a result of an emergency condition or accident event, the air outside of the external vacuum tank rushes through the breach or rupture in the external vacuum tank and into the vacuum cavity. As the air comes into contact with the surface of the wall of the internal pressure tank that contains the cryogenic fluid, such as liquid hydrogen, the air liquefies to form liquid air. Should the internal pressure tank also be breached or ruptured, the liquid hydrogen and the liquid air mix. Such a mixture is very volatile, in that it needs very little energy to be ignited. For example, if the tank holding the mixture is lightly tapped, it may explode, or if the mixture is suddenly exposed to sunlight, it may explode.

Thus, it would be desirable to solve the problem of, when there is a breach or rupture in the external vacuum tank and the internal pressure tank of a vacuum jacketed tank system, preventing the air outside of the vacuum jacketed tank system from entering the external vacuum tank and the vacuum cavity, liquefying, and mixing with the cryogenic fluid from the internal pressure tank.

Accordingly, there is a need in the art for an improved tank system and method that prevent or avoid a potential explosive situation should a vacuum jacketed tank system be breached in an emergency condition, that enhance the safety of a vacuum jacketed internal pressure tank containing a cryogenic fluid such as liquid hydrogen or liquid natural gas, that mitigate a safety concern for vacuum jacketed tank system certification, and that provide advantages over known tank systems and methods.

SUMMARY

Example implementations of the present disclosure provide an improved tank system having a removable plug assembly and method of using the same. As discussed in the below detailed description, versions of the improved tank system and method may provide significant advantages over known systems and methods.

In a version of the disclosure, there is provided a tank system having a removable plug assembly. The tank system comprises a vacuum tank having a vacuum tank main portion extending between vacuum tank end portions. The vacuum tank main portion has a vacuum tank skin.

The tank system further comprises a pressure tank mounted within the vacuum tank. The pressure tank is configured to contain a cryogenic fluid. The pressure tank comprises a pressure tank main portion extending between pressure tank end portions. The pressure tank main portion has one or more openings formed through the pressure tank main portion. The pressure tank main portion further has the removable plug assembly. The removable plug assembly comprises one or more removable plug elements. Each of the one or more removable plug elements is configured to plug and to unplug one of the one or more openings. The removable plug assembly further comprises a retraction mechanism positioned within an interior of the pressure tank. The retraction mechanism is coupled to the one or more removable plug elements.

The tank system further comprises a vacuum cavity formed between an exterior of the pressure tank and an interior of the vacuum tank. When an emergency condition occurs, the retraction mechanism is activated to pull the one or more removable plug elements away from the one or more openings and into the interior of the pressure tank, to allow the cryogenic fluid to exit and to flow from the pressure tank, through the one or more openings, and into the vacuum cavity, and when the vacuum tank has a breach, to allow the cryogenic fluid to further exit and flow out into air.

In another version of the disclosure, there is provided an aircraft. The aircraft comprises a fuselage with a plurality of fuselage barrel sections, and an outer aero skin at a fuselage mold line.

The aircraft further comprises a tank system having a removable plug assembly. The tank system comprises a vacuum tank having a vacuum tank main portion extending between vacuum tank end portions. The vacuum tank main portion has a vacuum tank skin.

The tank system further comprises a pressure tank mounted within the vacuum tank. The pressure tank is configured to contain a cryogenic fluid. The pressure tank comprises a pressure tank main portion extending between pressure tank end portions. The pressure tank main portion has one or more openings formed through the pressure tank main portion. The pressure tank main portion further has the removable plug assembly. The removable plug assembly comprises one or more removable plug elements. Each of the one or more removable plug elements is configured to plug and to unplug one of the one or more openings. The removable plug assembly further comprises a retraction mechanism positioned within an interior of the pressure tank. The retraction mechanism is coupled to the one or more removable plug elements.

The tank system further comprises a vacuum cavity formed between an exterior of the pressure tank and an interior of the vacuum tank. When an emergency condition occurs, the retraction mechanism is activated to pull the one or more removable plug elements away from the one or more openings and into the interior of the pressure tank, to allow the cryogenic fluid to exit and to flow from the pressure tank, through the one or more openings, and into the vacuum cavity, and when the vacuum tank has a breach, to allow the cryogenic fluid to further exit and flow out into air.

In another version of the disclosure, there is provided a method of using a tank system having a removable plug assembly to allow a cryogenic fluid to exit in an emergency condition. The method comprises the step of providing the tank system having the removable plug assembly.

The tank system comprises a vacuum tank having a vacuum tank main portion extending between vacuum tank end portions. The vacuum tank main portion has a vacuum tank skin. The tank system further comprises a pressure tank mounted within the vacuum tank. The pressure tank is configured to contain the cryogenic fluid. The pressure tank comprises a pressure tank main portion extending between pressure tank end portions. The pressure tank main portion has one or more openings formed through the pressure tank main portion. The pressure tank main portion further has the removable plug assembly. The removable plug assembly comprises one or more removable plug elements. Each of the one or more removable plug elements is configured to plug and to unplug one of the one or more openings. The removable plug assembly further comprises a retraction mechanism positioned within an interior of the pressure tank. The retraction mechanism is coupled to the one or more removable plug elements. The tank system further comprises a vacuum cavity formed between an exterior of the pressure tank and an interior of the vacuum tank.

The method further comprises the step of activating the retraction mechanism when the emergency condition occurs. The method further comprises the step of using the removable plug assembly of the tank system to pull, with the retraction mechanism, the one or more removable plug elements away from the one or more openings and into the interior of the pressure tank, to allow the cryogenic fluid to exit and to flow from the pressure tank, through the one or more openings, and into the vacuum cavity, and when the vacuum tank has a breach, to allow the cryogenic fluid to further exit and flow out into air.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

Figure 1:
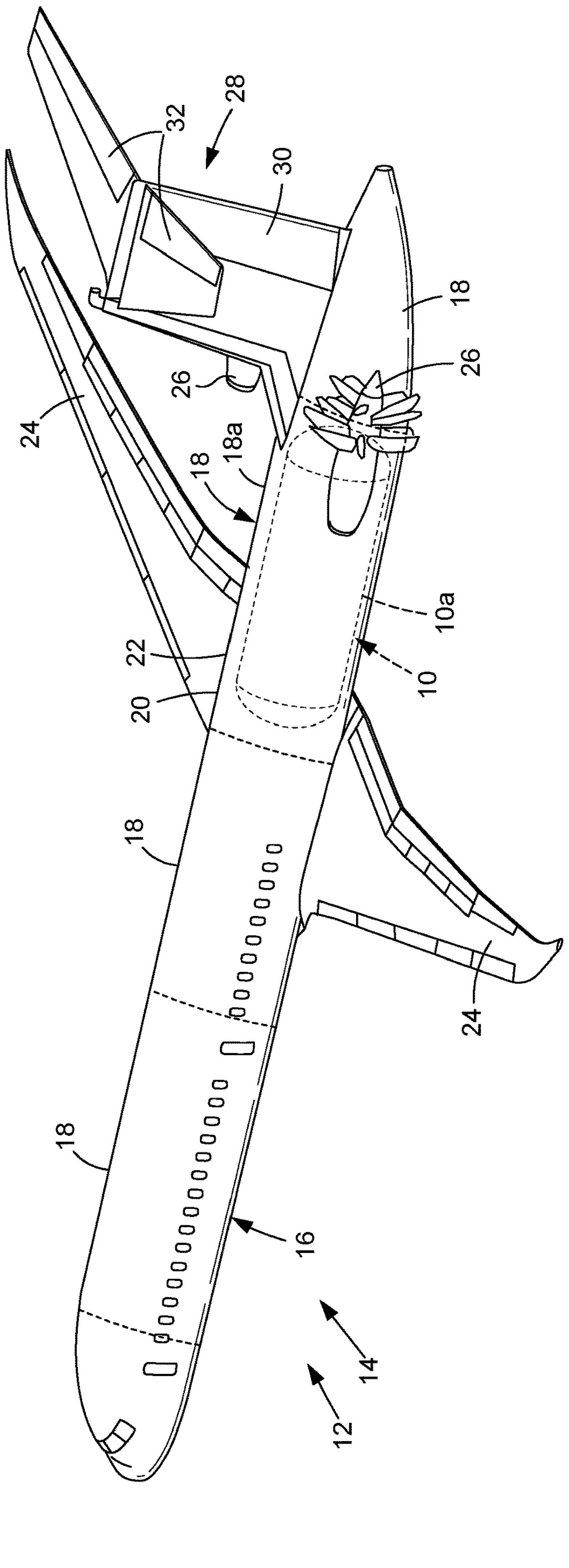
FIG. 1 is an illustration of a perspective view of an exemplary tank system of the disclosure disposed within a structure in the form of an aircraft.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Now referring to FIG. 1, FIG. 1 is an illustration of a perspective view of an exemplary tank system 10, such as a vacuum jacketed tank system 10*a*, of the disclosure disposed within a structure 12 comprising an aircraft 14. As shown in FIG. 1, the aircraft 14 comprises a fuselage 16 with a plurality of fuselage barrel sections 18 joined together, and an outer aero skin 20 at a fuselage mold line 22. As shown in FIG. 1, the tank system 10 is disposed or positioned in an aft fuselage barrel section 18*a* of the fuselage 16. The tank system 10 may also be structurally integrated with the aft fuselage barrel section 18*a* of the fuselage 16. The tank system 10 may be disposed or positioned in, or structurally integrated with other fuselage barrel sections 18 of the fuselage 16. As further shown in FIG. 1, the aircraft 14 comprises wings 24, propulsion units 26, and a tail 28. The tail 28 includes a vertical stabilizer 30 (see FIG. 1) and horizontal stabilizers 32 (see FIG. 1).

Figure 2:
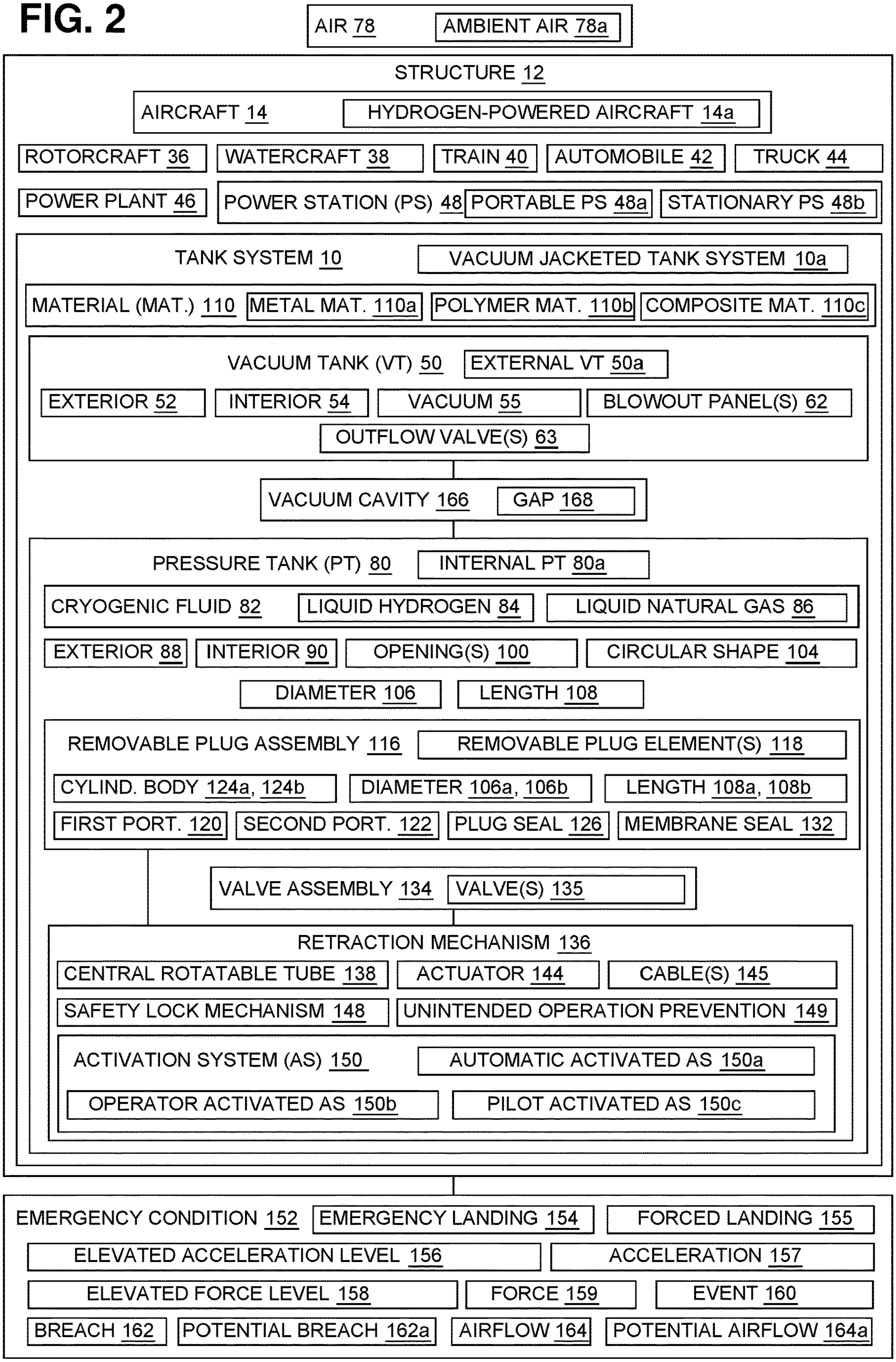
FIG. 2 is an illustration of a block diagram of an exemplary tank system of the disclosure for use in an exemplary structure.

Now referring to FIG. 2, FIG. 2 is an illustration of a block diagram of an exemplary tank system 10, such as a vacuum jacketed tank system 10*a*, of the disclosure, for use in, and powering of, an exemplary structure 12, such as an aircraft 14, for example, a hydrogen-powered aircraft 14*a*. The blocks in FIG. 2 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the tank system 10 in FIG. 2 are not meant to imply physical or architectural limitations to the manner in which an illustrative example may be implemented. Other components in addition to, or in place of, the ones illustrated may be used. Some components may be unnecessary.

As shown in FIG. 2, the structure 12 may also comprise other vehicles such as a rotorcraft 36, a watercraft 38, a train 40, an automobile 42, a truck 44, or another suitable vehicle. Further, as shown in FIG. 2, the structure 12 may also comprise a non-vehicle structure, such as a power plant 46, a power station (PS) 48, including a portable power station (PS) 48*a* or a stationary power station (PS) 48*b*, or another suitable non-vehicle structure.

Figure 3A:
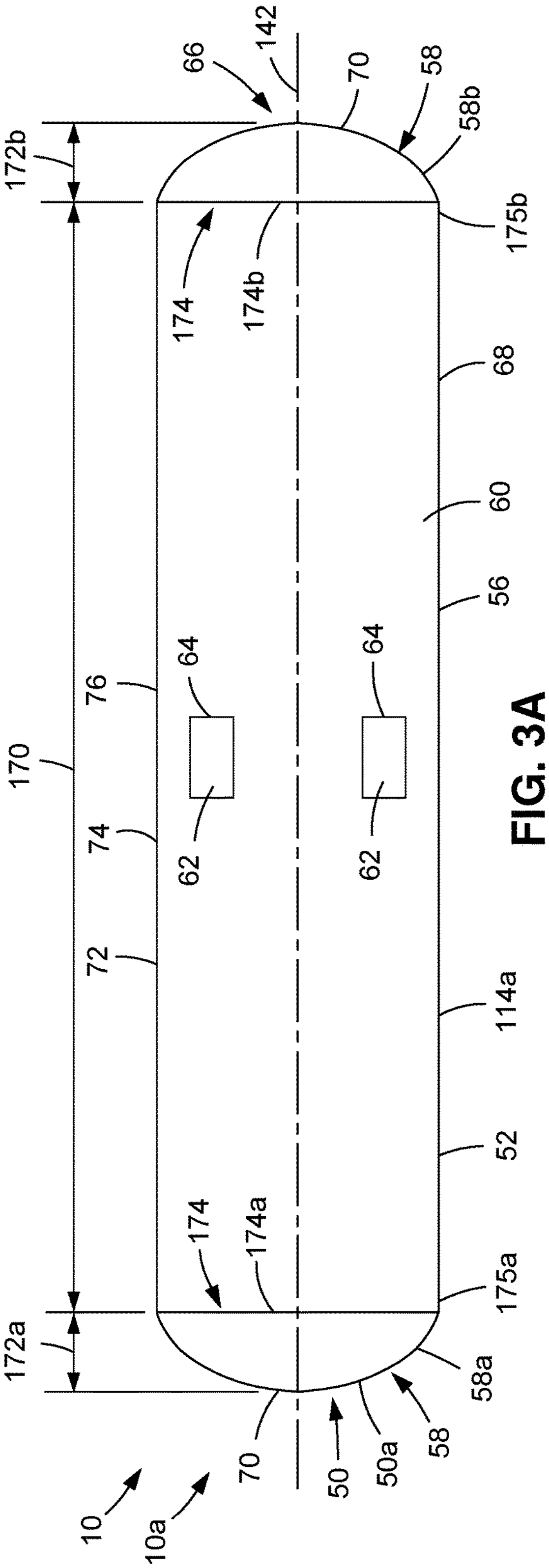
FIG. 3A is an illustration of a side view of an exemplary vacuum tank of an exemplary tank system of the disclosure.

As shown in FIG. 2, the tank system 10, such as the vacuum jacketed tank system 10*a*, comprises a vacuum tank (VT) 50, such as an external vacuum tank (VT) 50*a*. The vacuum tank 50 has an exterior 52 (see FIG. 2) and an interior 54 (see FIG. 2). The vacuum tank 50 is under a vacuum 55 (see FIG. 2) in the interior 54. The vacuum tank 50 has external pressure because of the difference between the inside the vacuum tank 50 under vacuum 55 and outside the vacuum tank 50 with pressure. The vacuum tank 50 is under pressure because the vacuum 55 cannot push against anything. As shown in FIG. 3A, the vacuum tank 50 has a vacuum tank main portion 56 extending between vacuum tank end portions 58, such as a forward vacuum tank end portion 58*a* and an aft vacuum tank end portion 58*b*. The vacuum tank main portion 56 has a vacuum tank skin 60 (see FIG. 3A). In one version, the vacuum tank 50 may further comprise one or more blowout panels 62 (see FIGS. 2, 3A) formed in a vacuum tank wall 64 (see FIG. 3A) of the vacuum tank 50. In another version, the vacuum tank 50 may further comprise one or more outflow valves 63 (see FIG. 2). In yet another version, the vacuum tank 50 may further comprise a large orifice or opening at a center of the aft vacuum tank end portion 58*b* (see FIG. 3A) to provide venting and that is designed to open up at 125% of limit load pressure, and the structure 12, such as the aircraft 14, is designed to a 150% limit load pressure, so a pressure that reaches 125% may be considered an emergency condition 152 (see FIG. 2). This large orifice or opening may be advantageous to provide a way for the tank system 10, including the vacuum tank 50 and the pressure tank 80, to vent to the air 78, such as the ambient air 78*a*, outside the tank system 10, to prevent a rapid pressure build up that could lead to an explosion, such as what occurs with the phenomenon known as BLEVE (boiling liquid expanding vapor explosion).

In one version, the vacuum tank 50 has a spherocylinder shape 66 (see FIG. 3A), or capsule shape, comprising a three-dimensional geometric shape with the vacuum tank main portion 56 having a substantially cylinder shape 68 (see FIG. 3A), and the vacuum tank end portions 58 each having a semi-ellipsoid shape 70 (see FIG. 3A). In other versions, the vacuum tank end portions 58 may have a hemisphere shape, or another curved shape. In other versions, the vacuum tank 50 has another suitable three-dimensional geometric shape.

In one version, the vacuum tank skin 60 has a longitudinal cross section 72 (see FIG. 3A) with a profile geometry 74 (see FIG. 3A) comprising a straight profile 76 (see FIG. 3A). In other versions, the vacuum tank skin 60 has a longitudinal cross section 72 with a profile geometry 74 having another suitable shape. The vacuum tank 50, such as the external vacuum tank 50*a*, is designed to withstand external pressure caused by air 78 (see FIG. 2), such as ambient air 78*a* (see FIG. 2), on the outside of the vacuum tank 50 and the vacuum 55 (see FIG. 2) inside the interior 54 of the vacuum tank 50. The primary stresses in the vacuum tank 50, such as the external vacuum tank 50*a*, are compression in both the longitudinal and the hoop directions.

As shown in FIG. 2, the tank system 10 further comprises a pressure tank (PT) 80, such as an internal pressure tank (PT) 80*a*, mounted within the vacuum tank 50. The pressure tank 80 is configured to contain, and contains, a cryogenic fluid 82 (see FIG. 2). As shown in FIG. 2, the cryogenic fluid 82 comprises one of, liquid hydrogen 84, liquid natural gas 86, or another suitable cryogenic fluid, and is designed to function as a fuel and to provide fuel power to the structure 12, such as the aircraft 14, or other structure. The pressure tank 80, such as the internal pressure tank 80*a*, carries the cryogenic fluid 82 under pressure. The primary stresses in the pressure tank 80, such as the internal pressure tank 80*a*, are tension in both the longitudinal and the hoop directions.

Figure 3B:
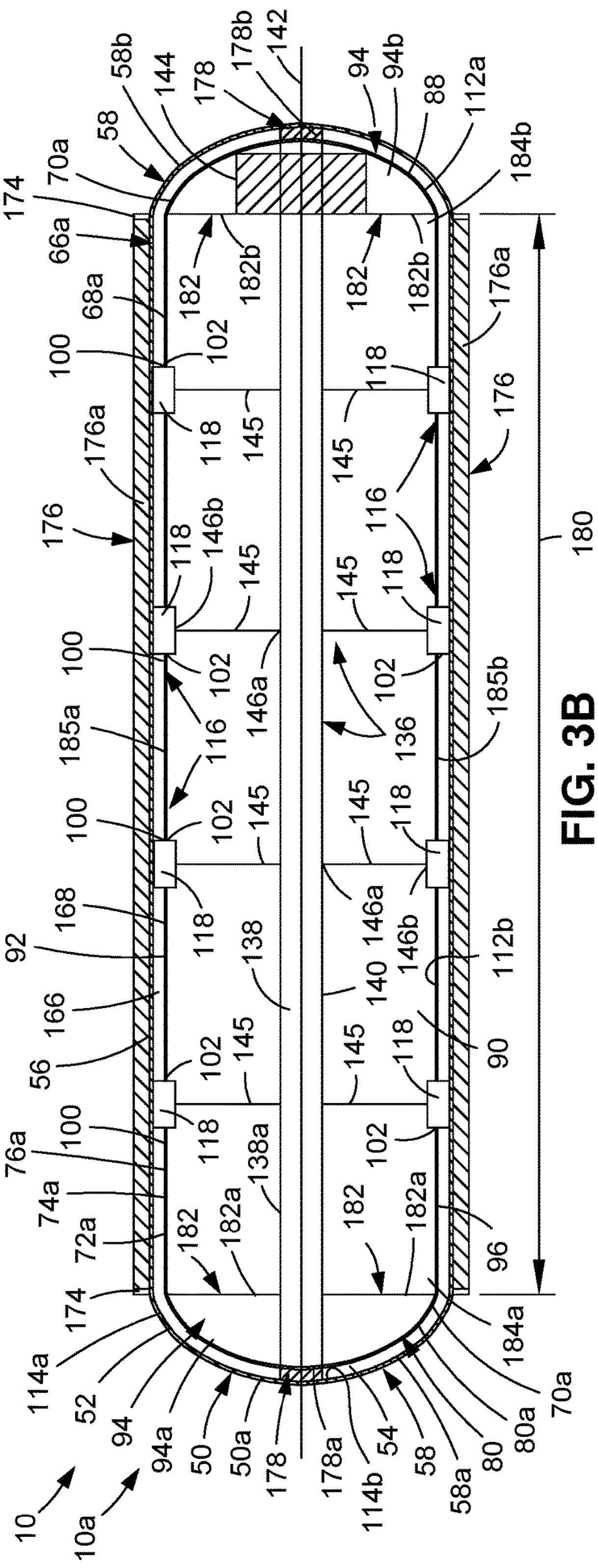
FIG. 3B is an illustration of a cross-sectional side view of an exemplary pressure tank within the vacuum tank of FIG. 3A, of the exemplary tank system of the disclosure.

As shown in FIG. 2, the pressure tank 80 has an exterior 88 and an interior 90. As shown in FIG. 3B, the pressure tank 80 has a pressure tank main portion 92 extending between pressure tank end portions 94, such as a forward pressure tank end portion 94*a* and an aft pressure tank end portion 94*b*. The pressure tank main portion 92 has a pressure tank skin 96 (see FIG. 3B). As shown in FIGS. 2, 3B, the pressure tank main portion 92 further has one or more openings 100 formed through the pressure tank skin 96, or wall, at one or more locations 102 (see FIG. 3B) on the pressure tank main portion 92.

In one version, each of the one or more openings 100 has a circular shape 104 (see FIG. 2) and each has a diameter 106 (see FIG. 2). In other versions, each of the one or more openings 100 has another suitable shape. In one version, the diameter 106 of each opening 100 has a length 108 (see FIG. 2) in a range of from 1 (one) inch (2.54 centimeters) to 12 (twelve) inches (30.48 centimeters) in length. In another version, the diameter 106 of each opening 100 has a length 108 (see FIG. 2) in a range of from 1 (one) inch (2.54 centimeters) to 2 (two) inches (5.08 centimeters) in length. In other versions, the diameter 106 of each opening 100 has another suitable length 108.

In one version, each of the one or more openings 100 is the same size with each diameter 106 having a length 108 that is the same or equal. In another version, one or more of the openings 100 are the same size with each diameter 106 having a length 108 that is the same or equal, and one or more of the openings 100 are of one or more different sizes with each diameter 106 having one or more lengths 108 that are different. In yet another version, each of the one or more openings 100 are of different sizes with each diameter 106 having a length 108 that is different.

In one version, the one or more openings 100 comprise a number in a range of 1 (one) opening 100 to 6 (six) openings 100. In other versions, the one or more openings 100 comprise a number in a range of 1 (one) opening 100 to 20 (twenty) openings 100. In other versions, the openings 100 comprise a number greater than 20 (twenty) openings 100.

The pressure tank 80 is designed and made of a material (MAT.) 110 (see FIG. 2) that is durable and suitable to withstand the extremely low temperatures of the cryogenic fluid 82 stored in the pressure tank 80, such as the liquid hydrogen 84, the liquid natural gas 86, or another suitable cryogenic fluid. The vacuum tank 50 is also designed or made of the material 110 that is durable and suitable to withstand the extremely low temperatures of the cryogenic fluid 82 once the cryogenic fluid 82 stored in the pressure tank 80 is released and contacts the vacuum tank 50.

For example, for liquid hydrogen 84 to be in a fully liquid state at atmospheric pressure, the liquid hydrogen 84 needs to be cooled to 20.28 K (Kelvin) (minus 252.87 degrees C. (Celsius); minus 423.17 degrees F. (Fahrenheit)). Further, for example, for the liquid natural gas 86 to be in a fully liquid state at atmospheric pressure, the liquid natural gas 86 needs to be cooled to 110.93 K (Kelvin) (minus 162 degrees C. (Celsius); minus 260 degrees F. (Fahrenheit)).

In one version, the pressure tank 80 and/or the vacuum tank 50 are formed of a metal material (MAT.) 110*a* (see FIG. 2) including steel, stainless steel, aluminum alloy, titanium alloy, copper, copper alloy, or another suitable metal material. In another version, the pressure tank 80 and/or the vacuum tank 50 are formed of a polymer material (MAT.) 110*b* (see FIG. 2), including thermoplastic, polytetrafluoroethylene (PTFE), polyetheretherketone (PEEK), high density polyethylene, polyamide, elastomer, rubber, or another suitable polymer material. In another version, the pressure tank 80 and/or the vacuum tank 50 are formed of a composite material (MAT.) 110*c* (see FIG. 2), including carbon fiber reinforced polymer (CFRP), or another suitable composite material. In another version, the pressure tank 80 and/or the vacuum tank 50 are formed of another suitable material designed to withstand extremely low temperatures of the cryogenic fluid 82. The pressure tank 80 and the vacuum tank 50 may be made of the material 110 that is the same or may be made of the material 110 that is different.

In one version, like the vacuum tank 50, the pressure tank 80 has a spherocylinder shape 66*a* (see FIG. 3B), or capsule shape, comprising a three-dimensional geometric shape with the pressure tank main portion 92 having a substantially cylinder shape 68*a* (see FIG. 3B), and the pressure tank end portions 94 each having a semi-ellipsoid shape 70*a* (see FIG. 3B). In other versions, the pressure tank 80 has another suitable three-dimensional geometric shape. As shown in FIG. 3B, the pressure tank 80 has a pressure tank outer surface 112*a* and a pressure tank inner surface 112*b*, and the vacuum tank 50 has a vacuum tank outer surface 114*a* and a vacuum tank inner surface 114*b*. As shown in FIG. 3B, the pressure tank outer surface 112*a* corresponds, or substantially corresponds, to the vacuum tank inner surface 114*b*.

In one version, the pressure tank skin 96 has a longitudinal cross section 72*a* (see FIG. 3B) with a profile geometry 74*a* (see FIG. 3B) comprising a straight profile 76*a* (see FIG. 3B). In other versions, the vacuum tank skin 60 has a longitudinal cross section 72*a* with a profile geometry 74*a* having another suitable shape.

As shown in FIG. 2, the pressure tank 80 further comprises a removable plug assembly 116. The removable plug assembly 116 comprises one or more removable plug elements 118, where each of the one or more removable plug elements 118 is configured to plug and to unplug each of the one of the one or more openings 100. For example, one removable plug element 118 plugs and unplugs one opening 100. The number of removable plug elements 118 corresponds to the number of openings 100.

Figure 4B:
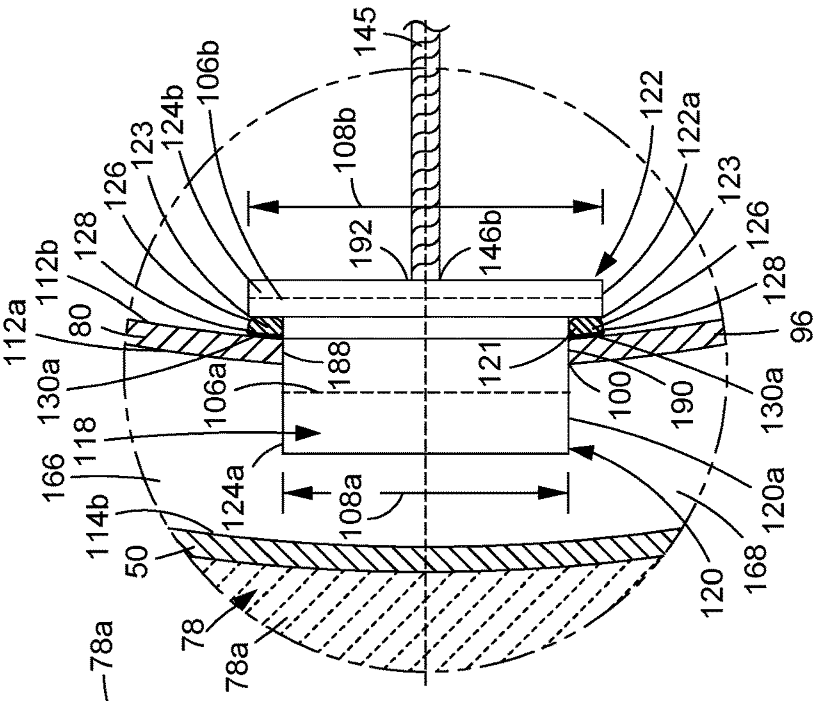
FIG. 4B is an illustration of a cross-sectional enlarged front view of a version of an exemplary removable plug element of the circle 4B of FIG. 4A.

In one version, the removable plug element 118 comprises a first portion (PORT.) 120 (see FIGS. 2, 4B), such as an outer portion 120*a* (see FIG. 4B), having a cylindrical (CYLIND.) body 124*a* (see FIGS. 2, 4B), with a diameter 106*a* (see FIGS. 2, 4B) having a length 108*a* (see FIGS. 2, 4B). The removable plug element 118 further comprises a second portion (PORT.) 122 (see FIGS. 2, 4B), such as an inner portion 122*a* (see FIG. 4B), coupled to, or integral with, the first portion 120, such as the outer portion 120*a*. The second portion 122, such as the inner portion 122*a*, has a cylindrical (CYLIND.) body 124*b* (see FIGS. 2, 4B), with a diameter 106*b* (see FIGS. 2, 4B) having a length 108*b* (see FIGS. 2, 4B). As shown in FIG. 4B, the length 108*b* of the diameter 106*b* of the second portion 122, such as the inner portion 122*a*, is greater than the length 108*a* of the diameter 106*a* of the first portion 120, such as the outer portion 120*a*. In other versions, the first portion 120, such as the outer portion 120*a*, and the second portion 122, such as the inner portion 122*a*, have other suitable shapes.

The first portion 120, such as the outer portion 120*a*, is of a sufficient size and the length 108*a* of the diameter 106*a* allows the first portion 120, such as the outer portion 120*a*, of the removable plug element 118 to fit within the opening 100, and the length 108*a* of the diameter 106*a* may be in a range of slightly less than 1 (one) inch (2.54 centimeters), for example, 0.99 inch (2.51 centimeters) to slightly less than 12 (twelve) inches (30.48 centimeters), for example, 11.99 inches (30.45 centimeters) in length. In other versions, the length 108*a* of the diameter 106*a* of the first portion 120, such as the outer portion 120*a*, has another suitable length that allows the removable plug element 118 to fit within the opening 100.

In one version, each of the one or more removable plug elements 118 is the same size and shape or configuration. In another version, each of the one or more removable plug elements 118 is a different size and shape or configuration. In yet another version, one or more of the removable plug elements 118 is the same size and shape or configuration, and one or more of the removable plug elements 118 is a different size and shape or configuration.

In one version, the one or more removable plug elements 118 comprise a number in a range of 1 (one) removable plug element 118 to 6 (six) removable plug elements 118. In other versions, the one or more removable plug elements 118 comprise a number in a range of 1 (one) removable plug element 118 to 20 (twenty) removable plug elements 118. In other versions, the removable plug elements 118 comprise a number greater than 20 (twenty) removable plug elements 118.

Each of the one or more removable plug elements 118 is made of the material 110 that is durable and able to withstand the low temperatures of the cryogenic fluid 82, including the liquid hydrogen 84, the liquid natural gas 86, or another suitable cryogenic fluid. In one version, the one or more removable plug elements 118 are formed of the metal material 110*a* (see FIG. 2) including steel, stainless steel, aluminum alloy, titanium alloy, copper, copper alloy, or another suitable metal material. In another version, the one or more removable plug elements 118 are formed of the polymer material 110*b* (see FIG. 2), including thermoplastic, polytetrafluoroethylene (PTFE), polyetheretherketone (PEEK), high density polyethylene, polyamide, elastomer, rubber, or another suitable polymer material. In another version, the one or more removable plug elements 118 are formed of the composite material 110*c* (see FIG. 2), including carbon fiber reinforced polymer (CFRP), or another suitable composite material. In another version, the one or more removable plug elements 118 are formed of another suitable material designed to withstand the extremely low temperatures of the cryogenic fluid 82. In one version, the one or more removable plug elements 118 and the pressure tank 80 are made of the same material 110. In another version, the one or more removable plug elements 118 and the pressure tank 80 are made of different materials 110.

As shown in FIG. 2, the tank system 10 may optionally comprise a plug seal 126. The plug seal 126 is coupled to one or more of the removable plug elements 118 at the one or more openings 100, when the removable plug element 118 is inserted and fitted within the opening 100. As shown in FIG. 4B, the plug seal 126 surrounds a base 121 of the first portion 120 and is seated against top surface portions 123 of the second portion 122. The plug seal 126 comprises an O-ring, a gasket, or another suitable plug seal member. The plug seal 126 is made of a polymer material 110*b* (see FIG. 2), such as plastic, elastomer, rubber, or another suitable plastic material. The plug seal 126 is discussed in further detail below with respect to FIG. 4B.

A sealant 128 (see FIG. 4B), such as an adhesive sealant, is preferably applied to one or more surfaces of the plug seal 126 (see FIG. 4B) and/or applied to one or more locations 130*a* (see FIG. 4B) on the pressure tank inner surface 112*b* at the opening 100, to further seal at the opening 100 and at the removable plug element 118 contacting the opening 100. Alternatively, the sealant 128, such as the adhesive sealant, may be used instead of the plug seal 126, to seal at and around the opening 100 and at and around the removable plug element 118 at the one or more locations 130*a* (see FIG. 4B) of the pressure tank inner surface 112*b* (see FIG. 4B). The sealant 128, such as the adhesive sealant, may comprise an epoxy adhesive, a silicone adhesive, or another suitable adhesive sealant capable of withstanding the extreme low temperatures of the cryogenic fluid 82 within the pressure tank 80.

Figure 5B:
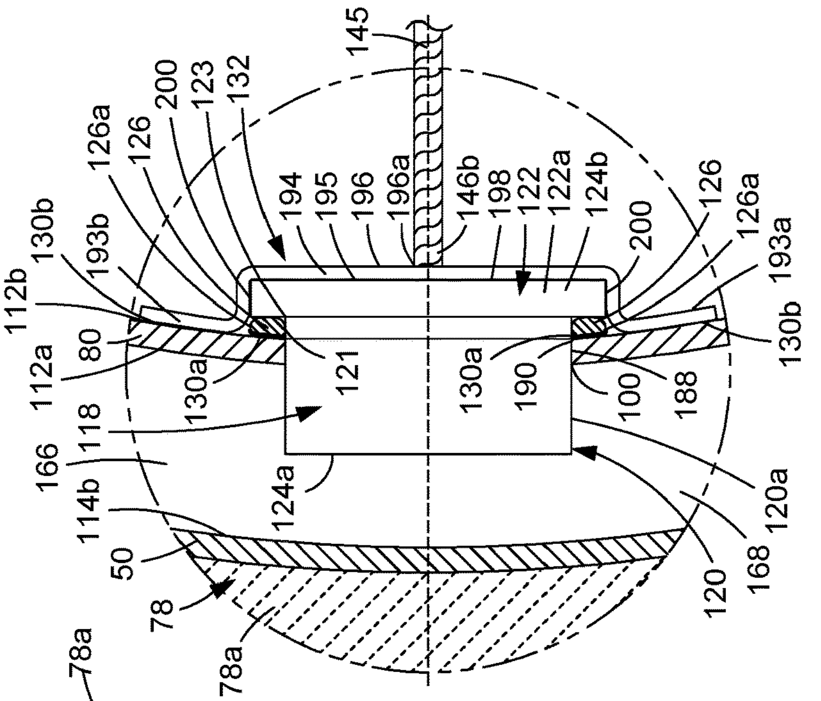
FIG. 5B is an illustration of a cross-sectional enlarged front view of another version of an exemplary removable plug element of the circle 5B of FIG. 5A.

As shown in FIG. 2, the tank system 10 may optionally further comprise a membrane seal 132. In one version, as shown in FIG. 5B, the membrane seal 132 is used in addition to, and in conjunction with, the plug seal 126. In another version, the membrane seal 132 is used instead of the plug seal 126. As shown in FIG. 5B, in one version, the membrane seal 132 is positioned over, and adjacent to, the second portion 122, such as the inner portion 122*a*, of the removable plug element 118, over the plug seal 126, and is coupled to locations 130*b* (see FIG. 5B) on the pressure tank inner surface 112*b* (see FIG. 5B). The membrane seal 132 is coupled to the pressure tank inner surface 112*b* with an attachment element such as adhesive or another suitable attachment element. The membrane seal 132 may comprise a metal foil, such as an aluminum foil or another suitable metal foil material, may comprise a polymeric material or plastic material, or may comprise another suitable material. Preferably, the membrane seal 132 is configured to be torn to allow the removable plug element 118 to be pulled through the membrane seal 132, when the removable plug element 118 is released from the opening 100. The membrane seal 132 is discussed in further detail below with respect to FIG. 5B.

As shown in FIG. 2, in another version, alternative to the removable plug assembly 116 with the removable plug elements 118, the pressure tank 80 may comprise a valve assembly 134 with one or more valves 135, each valve 135 located at the one or more openings 100. The one or more valves 135 are configured to close and to open to allow the cryogenic fluid 82 to exit and to flow from the pressure tank 80, through the one or more openings 100.

Figure 4A:
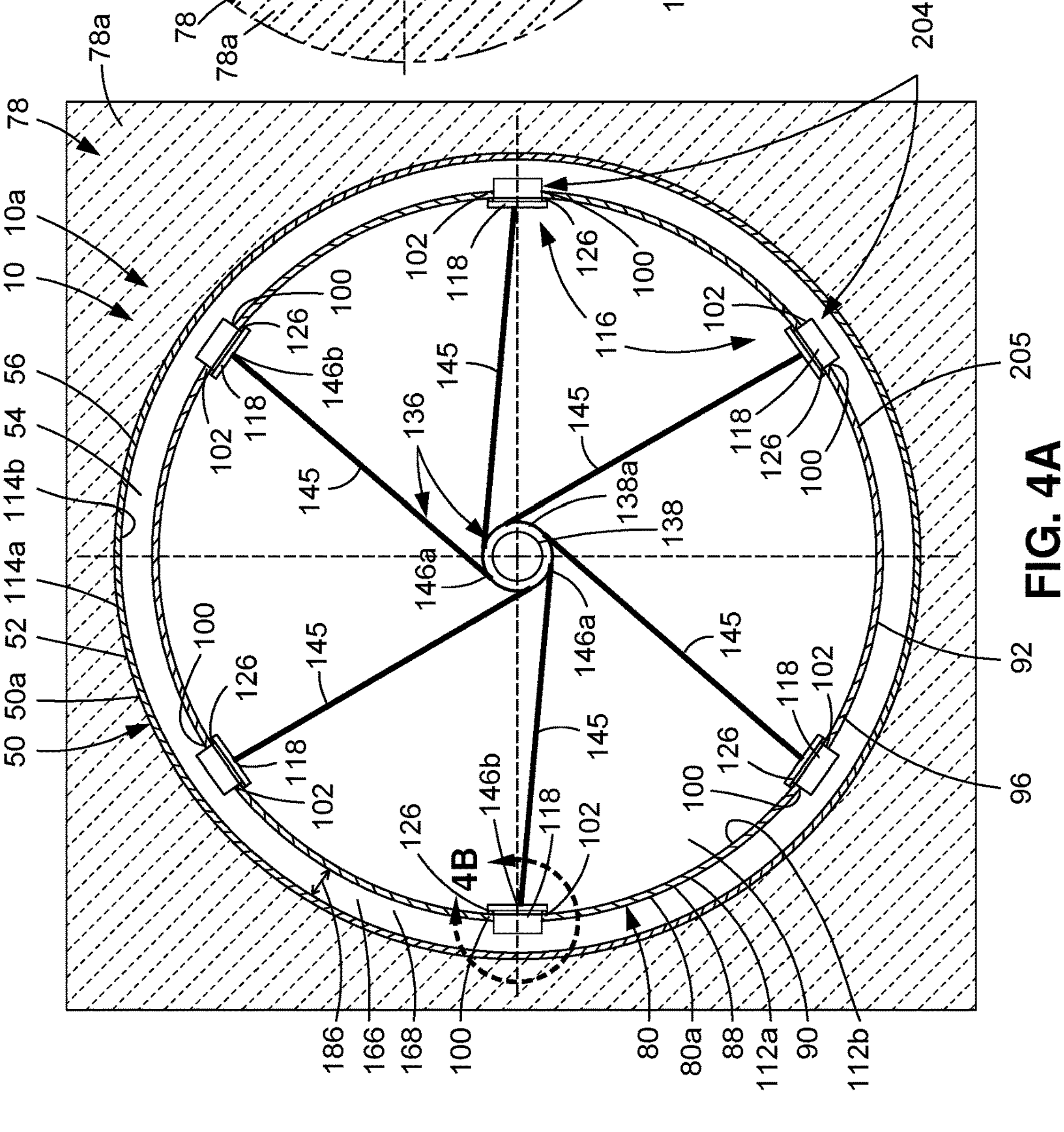
FIG. 4A is an illustration of a cross-sectional front view of an exemplary tank system of the disclosure, showing a version of a removable plug assembly with six removable plug elements.

As shown in FIG. 2, the pressure tank 80 further comprises a retraction mechanism 136 positioned within the interior 90 of the pressure tank 80. The retraction mechanism 136 is coupled, or attached, to the one or more removable plug elements 118 of the removable plug assembly 116. In one version, as shown in FIGS. 2, 3B, and 4A, the retraction mechanism 136 comprises a central rotatable tube 138 having a length 140 (see FIG. 3B) that runs along a longitudinal centerline 142 (see FIG. 3B). The retraction mechanism 136 further comprises an actuator 144 (see FIGS. 2, 3B) coupled to the central rotatable tube 138. The actuator 144 is configured to rotate the central rotatable tube 138. In one version, the actuator 144 preferably comprises a spring actuator with a latch that releases a spring to remove the removable plug elements 118 from the openings 100. In other versions, the actuator 144 may comprise a mechanical actuator powered by a motor or electric power, a hydraulic actuator powered by a motorized pump, or another suitable actuator.

As shown in FIGS. 2, 3B, and 4A, in one version, the retraction mechanism 136 further comprises one or more cables 145 attached to the central rotatable tube 138 and attached to the one or more removable plug elements 118, or attached to the one or more valves 135. As shown in FIG. 4A, each cable 145 has a first end 146*a* attached to the central rotatable tube 138, and each cable 145 has a second end 146*b* attached to the removable plug element 118, or attached to the valve 135. When the central rotatable tube 138 is rotated by the actuator 144, the cables 145 attached to the removable plug elements 118 start winding around an exterior 138*a* (see FIG. 3B) of the central rotatable tube 138. This puts tension into the cables 145.

As shown in FIG. 2, the retraction mechanism 136 may further comprise a safety lock mechanism 148 to provide unintended operation prevention 149 of the removable plug assembly 116, that is, to prevent unintended or accidental operation or activation of the removable plug assembly 116, causing the removable plug elements 118 to be released from the openings 100. The safety lock mechanism 148 may be attached at any number of locations on the retraction mechanism 136. The safety lock mechanism 148 is configured to be quickly disengaged, so that the retraction mechanism 136 is activated to release the removable plug assembly 116 or the valve assembly 134.

The retraction mechanism 136 is activated or caused to operate with an activation system 150 (see FIG. 2). The activation system 150 is activated when an emergency condition 152 (see FIG. 2), or an emergency situation, occurs. As shown in FIG. 2, the activation system 150 comprises an automatic activated activation system 150*a*, an operator activated activation system 150*b*, a pilot activated activation system 150*c*, or another suitable activation system.

As shown in FIG. 2, the emergency condition 152, or emergency situation, comprises one or more of, an emergency landing 154 of the aircraft 14, when the structure 12 comprises an aircraft 14, a forced landing 155 of the aircraft 14, when the structure 12 comprises an aircraft 14, the pressure tank 80 experiencing an elevated acceleration level 156 of acceleration 157, or high acceleration, of the aircraft 14, when the structure 12 comprises an aircraft 14, the pressure tank 80 experiencing an elevated force level 158 of force 159, or high force, an event 160 causing a breach 162 or a potential breach 162*a* of the vacuum tank 50, and/or an airflow 164 or a potential airflow 164*a* of the air 78, such as the ambient air 78*a*, into the pressure tank 80, or another type of emergency condition experienced by the structure 12, for example, the aircraft 14. The emergency landing 154 encompasses a crash landing. An example of an elevated force level 158 includes projectiles, such as bullets, or missiles, or other types of projectiles, being fired at the vacuum tank 50 and/or the pressure tank 80. Further, the emergency condition 152 includes any condition or event where there is an increased probability that the vacuum tank 50 might be breached to cause the air 78, such as ambient air 78*a*, to flow into the pressure tank 80. If the air 78, such as the ambient air 78*a*, mixes with the cryogenic fluid 82, such as the liquid hydrogen 84 or liquid natural gas 86, in the pressure tank 80, the resulting mixture is highly volatile and explosive with a very low activation energy. The removable plug assembly 116 of the tank system 10 allows the cryogenic fluid 82, such as the liquid hydrogen 84 or the liquid natural gas 86, to exit in the emergency condition 152.

Since the initiation of the activation system 150 to activate the retraction mechanism 136 may result in very large thermal leakage of the cryogenic fluid 82, such as the liquid hydrogen 84 or the liquid natural gas 86, from the pressure tank 80 to the outside ambient environment, measures are taken to ensure that the activation system 150 is initiated or activated only when necessary. Initiation or activation of the activation system 150 greatly reduces the range of a vehicle such as an aircraft 14, if the activation system 150 is initiated or activated for all of the pressure tanks 80 of the aircraft 14.

The activation system 150 is designed to be initiated or activated with the occurrence of several conditions or situations. In one version, the activation system 150 is operator or pilot actuated or activated, for example, with the operator activated activation system 150*b* or the pilot activated activation system 150*c*. If the operator or pilot anticipates an emergency condition 152 for which it is likely that the pressure tank 80 or pressure tanks 80 may rupture, for example, the emergency landing 154 or the forced landing 155 of the aircraft 14, the operator or pilot may manually initiate or activate the activation system 150, such as the operator activated activation system 150*b* or the pilot activated activation system 150*c*, from the flight deck or the cockpit of the aircraft 14 with a control for the activation system 150 located in the flight deck or the cockpit. The control that is located in the flight deck or the cockpit may have features to ensure that it cannot be accidentally initiated or activated.

In another version, the activation system 150 is automatically activated, for example, with the automatic activated activation system 150*a*. If the structure 12, such as the aircraft 14 or other vehicle, experiences elevated acceleration levels 156 of acceleration 157, or high acceleration, of the aircraft 14 or other vehicle over a predetermined threshold of acceleration 157, the activation system 150, such as the automatic activated activation system 150*a*, has a sensor that senses the elevated acceleration level 156 of acceleration 157, and is then automatically initiated or activated.

In yet another version, the activation system 150 is automatically activated, for example, with the automatic activated activation system 150*a*. If the pressure tank 80 of the structure 12, such as the aircraft 14 or other vehicle, experiences elevated acceleration levels 156 of acceleration 157, or high acceleration, above a predetermined threshold of acceleration 157 in a vicinity of the one or more pressure tanks 80, or if the pressure tank 80 experiences elevated force levels 158 of force 159, or high force, above a predetermined threshold of force 159 in a vicinity of the one or more pressure tanks 80, the activation system 150, such as the automatic activated activation system 150*a*, has a sensor that senses the elevated acceleration level 156 of acceleration 157, and has a sensor that senses the elevated force level 158 of force 159, and is then automatically initiated or activated.

In yet another version, an operator or a pilot of the vehicle, such as the aircraft 14, can manually override the activation system 150, such as the automatic activated activation system 150*a*, that is initiated or activated by the elevated acceleration levels 156 of acceleration 157 above the predetermined threshold of acceleration 157 of the aircraft 14 or in the vicinity of the pressure tanks 80. For example, there may be situations in which elevated acceleration levels 156 of acceleration 157 are present and it is not desirable to initiate the activation system 150, such as the automatic activated activation system 150*a*. In this situation, the operator or the pilot may use an override control located in the flight deck of the cockpit to override or disable the automatic initiation of the automatic activated activation system 150*a* caused by the elevated acceleration levels 156 of acceleration 157.

As further shown in FIGS. 2, 3B, the tank system 10, such as the vacuum jacketed tank system 10*a* further comprises a vacuum cavity 166 that forms a gap 168 between the pressure tank outer surface 112*a* and the vacuum tank inner surface 114*b*. The size of the gap 168 is a consequence of the geometry and design of the vacuum tank 50 and the pressure tank 80. For example, in one version, the gap 168 has a typical length of 1 (one) inch (2.54 centimeters). However, the gap 168 may have another suitable length. The pressure tank 80 is designed to fit the internal mold surface of the vacuum tank, thus maximizing the volume of the pressure tank 80 relative to the enclosed volume of the vacuum tank 50. If the gap 168 is small, this may result in favorable efficiency.

The vacuum cavity 166 formed around the pressure tank 80 provides an area for the air 78 to flow into and liquefy, should the vacuum tank 50 be breached. The vacuum cavity 166 limits the thermal transfer between the cryogenic fluid 82, such as the liquid hydrogen 84 or the liquid natural gas 86, and the ambient air 78*a*. When the pressure tank 80 and the vacuum tank 50 are breached, the cryogenic fluid 82, such as the liquid hydrogen 84 or the liquid natural gas 86, flows from the pressure tank 80 through the vacuum tank 50 and out into the air 78, such as the ambient air 78*a*. Since the pressure tank 80 is pressurized with a pressure greater than the ambient air 78*a*, the cryogenic fluid 82, such as the liquid hydrogen 84 or the liquid natural gas 86, flows outward into the ambient air 78*a*, instead of the air 78, such as the ambient air 78*a* flowing into the pressure tank 80. This is important as it prevents the formation of a mixture forming of the liquid air and the liquid hydrogen 84 or liquid natural gas 86, which is explosive.

The pressure tank 80, such as the internal pressure tank 80*a*, is configured with the removable plug assembly 116 having the removable plug elements 118 that are quick to release, or is configured with the valve assembly 134 having the valves 135 that are quick to open, to allow the rapid flow of the cryogenic fluid 82, such as the liquid hydrogen 84 or the liquid natural gas 86, from the pressure tank 80 into the vacuum cavity 166 between the pressure tank 80 and the vacuum tank 50. The one or more removable plug elements 118 or the one or more valves 135 are installed at the one or more openings to provide a quick release of the cryogenic fluid 82, such as the liquid hydrogen 84 or the liquid natural gas 86, from the pressure tank 80 into the vacuum cavity 166

The removable plug elements 118 or the valves 135 prevent the cryogenic fluid 82, such as the liquid hydrogen 84 or the liquid natural gas 86, from escaping from the pressure tank 80 during normal conditions or normal operation, when the structure 12 and the tank system 10 are not experiencing an emergency condition 152. The one or more openings 100 formed through the pressure tank skin 96 (see FIG. 3B) of the pressure tank 80 allow the cryogenic fluid 82, such as the liquid hydrogen 84 or the liquid natural gas 86, to quickly or rapidly flow into the vacuum cavity 166 in the emergency condition 152 or emergency situation, when the one or more removable plug elements 118 are pulled away from, and out of, the openings 100, or the one or more valves 135 are opened to the openings 100. In one version, the retraction mechanism 136 pulls the one or more removable plug elements 118 away from, and out of, the one or more openings 100 during the emergency condition 152 or emergency situation. In another version, the retraction mechanism 136 causes the one or more valves 135 to open at the one or more openings 100 during the emergency condition 152 or emergency situation.

The vacuum tank 50, such as the external vacuum tank 50*a*, provides a barrier between the ambient air 78*a* and the vacuum cavity 166. The vacuum tank 50, such as the external vacuum tank 50*a*, is designed to withstand the external pressure loading which is a result of the pressure of the ambient air 78*a* acting on the vacuum tank outer surface 114*a* of the vacuum tank 50, and nothing acting on the vacuum tank inner surface 114*b* of the vacuum tank 50. Further, the vacuum tank 50, such as the external vacuum tank 50*a*, maintains the vacuum cavity 166 between the vacuum tank 50 and the pressure tank 80, and also carries the external pressure load resulting from that vacuum 55 (see FIG. 2).

When an emergency condition 152 occurs, the retraction mechanism 136 is activated to pull the one or more removable plug elements 118 away from, and out of, the one or more openings 100 and into the interior 90 of the pressure tank 80, to allow the cryogenic fluid 82, such as the liquid hydrogen 84 or the liquid natural gas 86, to exit and to flow from the pressure tank 80, through the one or more openings 100, and into the vacuum cavity 166. When the vacuum tank 50 has a breach 162 (see FIG. 2), the cryogenic fluid 82, such as the liquid hydrogen 84 or the liquid natural gas 86, is further allowed to exit and to flow out into the air 78, such as the ambient air 78*a*.

Now referring to FIGS. 3A-3B, FIG. 3A is an illustration of a side view of an exemplary vacuum tank 50, such as an external vacuum tank 50*a*, of an exemplary tank system 10 (see also FIG. 2), such as a vacuum jacketed tank system 10*a*, of the disclosure. FIG. 3B is an illustration of a cross-sectional side view of an exemplary pressure tank 80, such as an internal pressure tank 80*a*, within the vacuum tank 50, such as the external vacuum tank 50*a*, of FIG. 3A, of the exemplary tank system 10 (see also FIG. 2), such as the vacuum jacketed tank system 10*a*, of the disclosure.

As shown in FIGS. 3A-3B, the vacuum tank 50 comprises the exterior 52 having the vacuum tank outer surface 114*a*, and the interior 54 (see FIG. 3B) having the vacuum tank inner surface 114*b* (see FIG. 3B). The vacuum tank 50 is under a vacuum 55 (see FIG. 2) in the interior 54. The vacuum tank 50 withstands external pressure caused by ambient air 78*a* (see FIG. 2) on the outside and on the exterior 52 of the vacuum tank 50 and the vacuum 55 inside the interior 54 of the vacuum tank 50.

As shown in FIGS. 3A-3B, the vacuum tank 50 has a vacuum tank main portion 56 extending between vacuum tank end portions 58, such as the forward vacuum tank end portion 58*a* and the aft vacuum tank end portion 58*b*. As shown in FIG. 3A, the vacuum tank main portion 56 has a vacuum tank main portion length 170. As further shown in FIG. 3A, the forward vacuum tank end portion 58*a* has a forward length 172*a*, and the aft vacuum tank end portion 58*b* has an aft length 172*b*. As shown in FIG. 3A, in this version of the vacuum tank 50, the forward length 172*a* and the aft length 172*b* are the same size lengths, and the forward length 172*a* and the aft length 172*b* are each less length size than the size of the vacuum tank main portion length 170. In another version, the forward length 172*a* and the aft length 172*b* may be different size lengths.

As shown in FIG. 3A, the vacuum tank main portion 56 has end rings 174 (see also FIG. 3B), including a forward end ring 174*a* and an aft end ring 174*b*. The forward end ring 174*a* is a structure attached around a circumference at a forward end 175*a* (see FIG. 3A) of the vacuum tank main portion 56, and the forward end ring 174*a* is positioned between the forward end 175*a* of the vacuum tank main portion 56 and the forward vacuum tank end portion 58*a*. The aft end ring 174*b* is a structure attached around a circumference at an aft end 175*b* (see FIG. 3A) of the vacuum tank main portion 56, and the aft end ring 174*b* is positioned between the aft end 175*b* of the vacuum tank main portion 56 and the aft vacuum tank end portion 58*b*.

As shown in FIG. 3A, the vacuum tank 50 has a spherocylinder shape 66, or capsule shape, comprising a three-dimensional geometric shape with the vacuum tank main portion 56 having a substantially cylinder shape 68, and the vacuum tank end portions 58 each having a semi-ellipsoid shape 70. In other versions, the vacuum tank 50 has another suitable three-dimensional geometric shape. The vacuum tank 50 may have an untapered, straight profile, may have a tapered profile, or may have another suitable profile.

The vacuum tank main portion 56 has the vacuum tank skin 60 (see FIG. 3A). As shown in FIG. 3A, in this version, the vacuum tank skin 60 of the vacuum tank main portion 56 has the longitudinal cross section 72 with the profile geometry 74 comprising the straight profile 76. However, in other versions, the vacuum tank skin 60 may have the longitudinal cross section 72 with the profile geometry 74 having another suitable profile geometry.

As shown in FIG. 3B, stiffener members 176, such as stringers 176*a*, in the longitudinal direction may be coupled, or attached, to various portions along the vacuum tank outer surface 114*a* on the exterior 52 of the vacuum tank 50. The stiffener members 176, such as the stringers 176*a*, are removed in FIG. 3A for clarity.

As shown in FIG. 3A, the vacuum tank 50 further comprises blowout panels 62 formed in the vacuum tank wall 64 (see FIG. 3A) of the vacuum tank 50. The exterior of the blowout panels 62 is preferably flush or continuous with the exterior of the vacuum tank skin 60. The blowout panel 62 is a safety device used to relieve pressure inside the tank system 10 and to convey any explosive effect from inside the tank system 10 to outside the tank system 10 in the ambient air 78*a*. The blowout panels 62 are designed to open at a predetermined pressure to avoid a potentially explosive atmosphere or to safely convey any explosive effects. FIGS. 3A-3B further show the longitudinal centerline 142 of the vacuum tank 50 and the pressure tank 80.

As shown in FIG. 3B, the pressure tank 80, such as the internal pressure tank 80*a*, is mounted within the vacuum tank 50, and is attached to the interior 54 of the vacuum tank 50 with tank attach fittings 178, such as a forward tank attach fitting 178*a* and an aft tank attach fitting 178*b*. The pressure tank 80 is configured to contain, and contains, the cryogenic fluid 82 (see FIG. 2), such as the liquid hydrogen 84, the liquid natural gas 86, or another suitable cryogenic fluid.

As shown in FIG. 3B, the pressure tank 80 comprises the exterior 88 having the pressure tank outer surface 112*a*, and the interior 90 having the pressure tank inner surface 112*b*. As further shown in FIG. 3B, the pressure tank 80 comprises the pressure tank main portion 92 extending between pressure tank end portions 94, such as the forward pressure tank end portion 94*a* and the aft pressure tank end portion 94*b*. As shown in FIG. 3B, the pressure tank main portion 92 has a pressure tank main portion length 180. In one version, the pressure tank main portion length 180 (see FIG. 3B) is the same length, or substantially the same length, as the vacuum tank main portion length 170 (see FIG. 3A)

As shown in FIG. 3B, the pressure tank main portion 92 has end boundaries 182, including forward end boundaries 182*a* and aft end boundaries 182*b*. As shown in FIG. 3B, the forward end boundaries 182*a* are positioned between a forward end 184*a* of the pressure tank main portion 92 and the forward pressure tank end portion 94*a*, and the aft end boundaries 182*b* are positioned between an aft end 184*b* of the pressure tank main portion 92 and the aft pressure tank end portion 94*b*.

As shown in FIG. 3B, the pressure tank 80 has a sphero-cylinder shape 66*a*, or capsule shape, comprising a three-dimensional geometric shape with the pressure tank main portion 92 having a substantially cylinder shape 68*a*, and the pressure tank end portions 94 each having a semi-ellipsoid shape 70*a*. In other versions, the pressure tank 80 has another suitable three-dimensional geometric shape.

The pressure tank main portion 92 has the pressure tank skin 96 (see FIG. 3B). As shown in FIG. 3B, in this version, the pressure tank skin 96 of the pressure tank main portion 92 has the longitudinal cross section 72*a* with the profile geometry 74*a* comprising the straight profile 76*a*. However, in other versions, the pressure tank skin 96 may have the longitudinal cross section 72*a* with the profile geometry 74*a* having another suitable profile geometry. The pressure tank 80 may or may not be designed to be very closely related geometrically to the vacuum tank 50. For example, the longitudinal cross section 72*a* with the profile geometry 74*a* having the straight profile 76*a* of the pressure tank 80 may correspond to the longitudinal cross section 72 with the profile geometry 74 having the straight profile 76 of the vacuum tank 50.

FIG. 3B further shows the vacuum cavity 166 with the gap 168 between the pressure tank outer surface 112*a* of the pressure tank 80 and the vacuum tank inner surface 114*b* of the vacuum tank 50. The gap 168 is determined based on the geometry and design of the pressure tank 80 and the vacuum tank 50. In one version, the pressure tank 80 may be designed to fit the inner mold line or inner mold surface of the vacuum tank 50, thus maximizing the volume of the pressure tank 80 relative to the enclosed volume of the vacuum tank 50.

As shown in FIG. 3B, the pressure tank main portion 92 further has openings 100 formed through the pressure tank skin 96 at one or more locations 102 on the pressure tank main portion 92. As shown in FIG. 3B, the pressure tank main portion 92 has 4 (four) openings 100 on a top side 185*a* and 4 (four) openings 100 on a bottom side 185*b*. Each opening 100 on the top side 185*a* is opposite each respective opening 100 on the bottom side 185*b*.

As further shown in FIG. 3B, the pressure tank 80 comprises the removable plug assembly 116. The removable plug assembly 116 comprises removable plug elements 118, where each of the removable plug elements 118 is configured to plug and to unplug each of the openings 100. The number of removable plug elements 118 corresponds to the number of openings 100. As shown in FIG. 3B, the removable plug assembly 116 has 4 (four) removable plug elements 118 plugged in, or inserted in, the 4 (four) openings 100 on the top side 185*a*, and the removable plug assembly 116 has 4 (four) removable plug elements 118 plugged in, or inserted in, the 4 (four) openings 100 on the bottom side 185*b*.

As shown in FIG. 3A, the pressure tank 80 further comprises the retraction mechanism 136 positioned within the interior 90 of the pressure tank 80. The retraction mechanism 136 comprises the central rotatable tube 138 having a length 140 (see FIG. 3B) that runs along the longitudinal centerline 142 (see FIG. 3B). The retraction mechanism 136 further comprises the actuator 144 (see FIG. 3B) coupled to the central rotatable tube 138. The actuator 144 is configured to rotate the central rotatable tube 138.

As shown in FIG. 3B, in one version, the retraction mechanism 136 further comprises one or more cables 145 attached to the central rotatable tube 138 and attached to the one or more removable plug elements 118. As shown in FIG. 3B, each cable 145 has a first end 146*a* attached to the central rotatable tube 138, and each cable 145 has a second end 146*b* attached to the removable plug element 118. When the central rotatable tube 138 is rotated by the actuator 144, the cables 145 attached to the removable plug elements 118 start winding around an exterior 138*a* (see FIG. 3B) of the central rotatable tube 138. This puts tension into the cables 145.

Now referring to FIG. 4A, FIG. 4A is an illustration of a cross-sectional front view of an exemplary tank system 10, such as a vacuum jacketed tank system 10*a*, of the disclosure, showing a version of a removable plug assembly 116 with six (6) removable plug elements 118 with plug seals 126. As shown in FIG. 4A, the tank system 10, such as the vacuum jacketed tank system 10*a*, comprises the vacuum tank 50, such as the external vacuum tank 50*a*, having the exterior 52 with the vacuum tank outer surface 114*a*, and the interior 54 with the vacuum tank inner surface 114*b*. FIG. 4A shows the vacuum tank main portion 56 and shows air 78, such as ambient air 78*a*, surrounding the exterior 52 of the vacuum tank 10. The vacuum tank 50 is under a vacuum 55 (see FIG. 2) in the interior 54.

As shown in FIG. 4A, the tank system 10 further comprises the pressure tank 80, such as the internal pressure tank 80*a*, mounted within the vacuum tank 50. The pressure tank 80 is configured to contain the cryogenic fluid 82 (see FIGS. 2, 9A), such as liquid hydrogen 84 (see FIGS. 2, 9A), liquid natural gas 86 (see FIG. 2), or another suitable cryogenic fluid. As shown in FIG. 4A, the pressure tank 80 has the exterior 88 with the pressure tank outer surface 112*a*, and the interior 90 with the pressure tank inner surface 112*b*. FIG. 4B shows the pressure tank main portion 92 with the pressure tank skin 96. As shown in FIG. 4A, the openings 100, such as six (6) openings 100, are formed through the pressure tank skin 96 at locations 102 on the pressure tank main portion 92. As shown in FIG. 4A, each removable plug element 118 is inserted through each opening 100 and is securely fitted in each opening 100. The removable plug elements 118 prevent the cryogenic fluid 82, such as the liquid hydrogen 84 or the liquid natural gas 86, from escaping from the pressure tank 80 during normal conditions or operation. As shown in FIG. 4A, in this version, the six (6) removable plug elements 118 are spaced apart from each other in an equal distance spaced relationship 204 around a perimeter 205 of the pressure tank 80.

As shown in FIG. 4A, the pressure tank 80 further comprises the retraction mechanism 136 positioned within the interior 90 of the pressure tank 80. The retraction mechanism 136 comprises the central rotatable tube 138, the cables 145, and the actuator 144 (see FIG. 3B). The retraction mechanism 136 is coupled, or attached, to the removable plug elements 118 of the removable plug assembly 116, via the cables 145. Each cable 145 has a first end 146*a* (see FIG. 4A) attached to the central rotatable tube 138 and a second end 146*b* (see FIG. 4A) attached to the removable plug element 118. As shown in FIG. 4A, there are six (6) cables 145, and each cable 145 is coupled, or attached, to one removable plug element 118. When the central rotatable tube 138 is rotated by the actuator 144 (see FIG. 3B), the cables 145 attached to the removable plug elements 118 start winding around an exterior 138*a* (see FIG. 3B) of the central rotatable tube 138. This puts tension into the cables 145. As shown in FIG. 4A, the number of removable plug elements 118 corresponds to the number of openings 100 and corresponds to the number of cables 145. The retraction mechanism 136 is configured to pull the removable plug elements 118 away from, and out of, the openings 100 during the emergency condition 152 (see FIG. 2).

FIG. 4A further shows the vacuum cavity 166 and the gap 168 formed between the vacuum tank inner surface 114*b* of the vacuum tank 50 and the pressure tank outer surface 112*a* of the pressure tank 80. As shown in FIG. 4A, the gap 168 has a width 186 from the vacuum tank inner surface 114*b* to the pressure tank outer surface 112*a*, and the width 186 of the gap 168 may be constant and uniform between the vacuum tank 50 and the pressure tank 80.

Now referring to FIG. 4B, FIG. 4B is an illustration of a cross-sectional enlarged front view of a version of an exemplary removable plug element 118 of the circle 4B of FIG. 4A. In one version, as shown in FIG. 4B, the removable plug element 118 comprises the first portion 120, such as the outer portion 120*a*, having the cylindrical body 124*a* with a diameter 106*a* having a length 108*a*. As shown in FIG. 4B, the removable plug element 118 further comprises the second portion 122, such as the inner portion 122*a*, coupled to, or integral with, the first portion 120, such as the outer portion 120*a*, and having the cylindrical body 124*b* with a diameter 106*b* having a length 108*b*. As shown in FIG. 4B, the length 108*b* of the diameter 106*b* of the second portion 122, such as the inner portion 122*a*, is greater than the length 108*a* of the diameter 106*a* of the first portion 120, such as the outer portion 120*a*. In other versions, the first portion 120, such as the outer portion 120*a*, and the second portion 122, such as the inner portion 122*a*, have other suitable shapes. The first portion 120, such as the outer portion 120*a*, is of a sufficient size and the length 108*a* of the diameter 106*a* allows the first portion 120, such as the outer portion 120*a*, of the removable plug element 118 to fit within the opening 100. As shown in FIG. 4B, exterior side surfaces 188 of the first portion 120 are in contact with walls 190 of the opening 100 formed in the pressure tank 80. The second portion 122, such as the inner portion 122*a*, is of a sufficient size and the length 108*b* of the second portion 122 is greater than the length 108*a* of the first portion 120 to prevent the removable plug element 118 from moving radially past the pressure tank skin 96.

As shown in FIG. 4B, the plug seal 126 is coupled to the removable plug element 118 at the opening 100, to provide a sealing of the opening 100 when the removable plug element 118 is inserted and fitted within the opening 100. As shown in FIG. 4B, the plug seal 126 surrounds the base 121 of the first portion 120 and is seated against the top surface portions 123 of the second portion 122.

As shown in FIG. 4B, a sealant 128 (see FIG. 4B), such as an adhesive sealant, may optionally be applied to one or more surfaces of the plug seal 126 and/or applied to one or more locations 130*a* on the pressure tank inner surface 112*b* at the opening 100, to further seal at the opening 100 and at the removable plug element 118 contacting the opening 100. Alternatively, the sealant 128, such as the adhesive sealant, may be used instead of the plug seal 126, to seal at and around the opening 100 and at and around the removable plug element 118 at the one or more locations 130*a* (see FIG. 4B) on the pressure tank inner surface 112*b* (see FIG. 4B).

FIG. 4B further shows the second end 146*b* of the cable 145 attached to an inner end 192 of the second portion 122. FIG. 4B further shows the vacuum tank 50, and the vacuum cavity 166 and the gap 168 formed between the vacuum tank inner surface 114*b* of the vacuum tank 50 and the pressure tank outer surface 112*a* of the pressure tank 80. FIG. 4B further shows the air 78, such as the ambient air 78*a*, outside the vacuum tank 50.

Figure 5A:
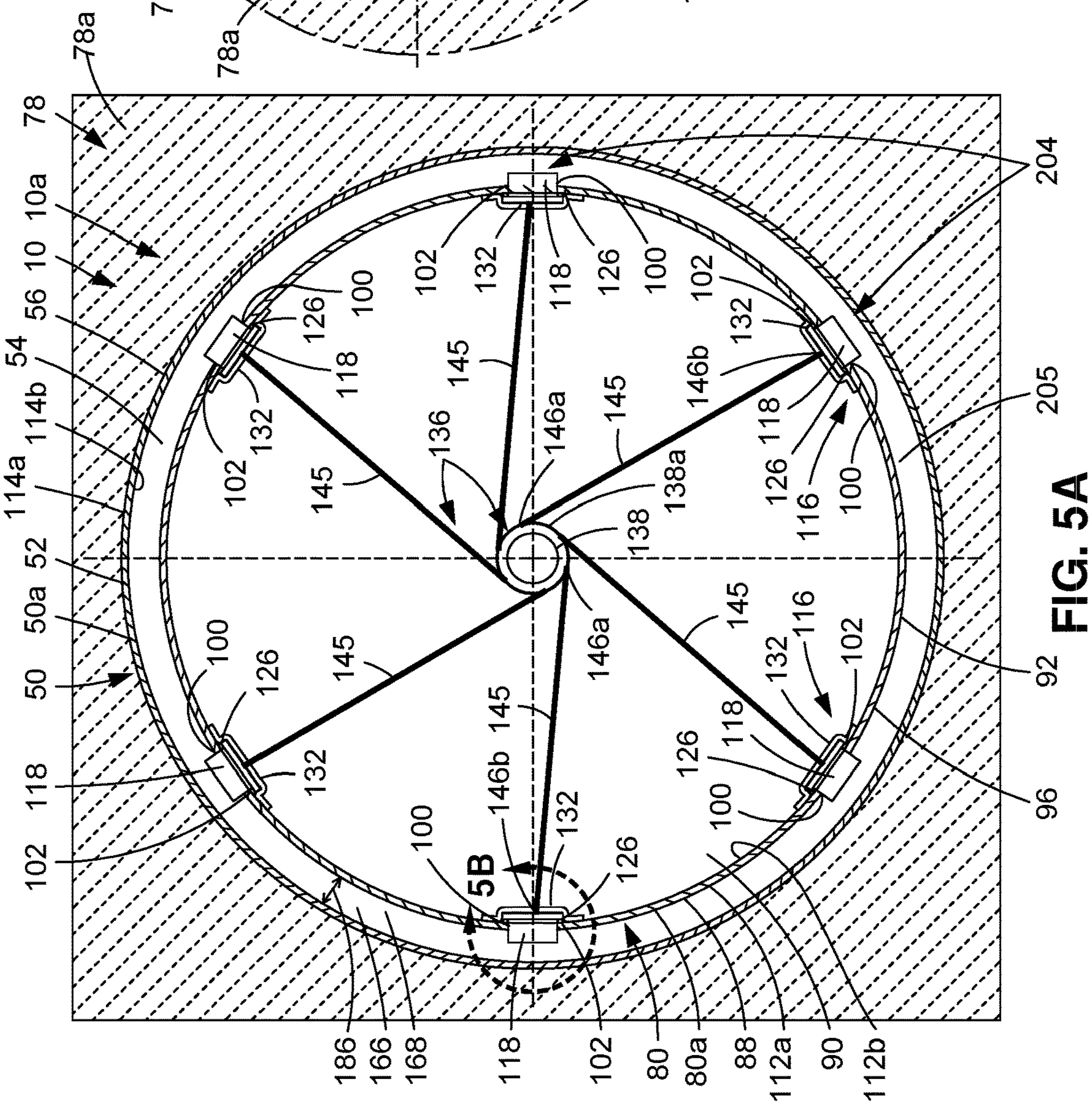
FIG. 5A is an illustration of a cross-sectional front view of an exemplary tank system of the disclosure, showing another version of a removable plug assembly with six removable plug elements.

Now referring to FIG. 5A, FIG. 5A is an illustration of a cross-sectional front view of an exemplary tank system 10, such as the vacuum jacketed tank system 10*a*, of the disclosure, showing another version of a removable plug assembly 116 with six (6) removable plug elements 118, where each removable plug element 118 is further sealed with a membrane seal 132. As shown in FIG. 5A, the membrane seal 132 is used in addition to, and in conjunction with, the plug seal 126 for each removable plug element 118.

Like the tank system 10 in FIG. 4A, the tank system 10 shown in FIG. 5A comprises the vacuum tank 50, such as the external vacuum tank 50*a*, having the exterior 52 with the vacuum tank outer surface 114*a*, the interior 54 with the vacuum tank inner surface 114*b*, and the vacuum tank main portion 56. FIG. 5A shows the air 78, such as ambient air 78*a*, surrounding the exterior 52 of the vacuum tank 50.

As shown in FIG. 5A, the tank system 10 further comprises the pressure tank 80, such as the internal pressure tank 80*a*, mounted within the vacuum tank 50, and the pressure tank 80 is configured to contain the cryogenic fluid 82 (see FIGS. 2, 9A), such as liquid hydrogen 84 (see FIGS. 2, 9A), liquid natural gas 86 (see FIG. 2), or another suitable cryogenic fluid. As shown in FIG. 5A, the pressure tank 80 has the exterior 88 with the pressure tank outer surface 112*a*, the interior 90 with the pressure tank inner surface 112*b*, the pressure tank main portion 92 with the pressure tank skin 96, and the openings 100, such as six (6) openings 100, formed through the pressure tank skin 96 at locations 102 on the pressure tank main portion 92. As shown in FIG. 5A, in this version, the six (6) removable plug elements 118 are spaced apart from each other in the equal distance spaced relationship 204 around the perimeter 205 of the pressure tank 80.

FIG. 5A further shows the retraction mechanism 136 positioned within the interior 90 of the pressure tank 80, and having the central rotatable tube 138 and the cables 145. Each cable 145 has the first end 146*a* (see FIG. 5A) attached to the central rotatable tube 138 and the second end 146*b* (see FIG. 5A) attached to the removable plug element 118. As shown in FIG. 5A, there are six (6) cables 145, and each cable 145 is coupled, or attached, to one removable plug element 118. When the central rotatable tube 138 is rotated by the actuator 144 (see FIG. 3B), the cables 145 attached to the removable plug elements 118 start winding around an exterior 138*a* (see FIG. 5A) of the central rotatable tube 138. This puts tension into the cables 145.

FIG. 5A further shows the vacuum cavity 166 and the gap 168 formed between the vacuum tank inner surface 114*b* of the vacuum tank 50 and the pressure tank outer surface 112*a* of the pressure tank 80. As shown in FIG. 5A, the gap 168 has the width 186 from the vacuum tank inner surface 114*b* to the pressure tank outer surface 112*a*, and in this version, the width 186 of the gap 168 is constant and uniform between the vacuum tank 50 and the pressure tank 80.

Now referring to FIG. 5B, FIG. 5B is an illustration of a cross-sectional enlarged front view of another version of the exemplary removable plug element 118 of the circle 5B of FIG. 5A, where the removable plug element 118 is further sealed with the membrane seal 132 in addition to the plug seal 126.

Like the removable plug element 118 in FIG. 4B, the removable plug element 118 in FIG. 5B comprises the first portion 120, such as the outer portion 120*a*, having the cylindrical body 124*a*, the second portion 122, such as the inner portion 122*a*, coupled to, or integral with, the first portion 120, such as the outer portion 120*a*, and having the cylindrical body 124*b*. As shown in FIG. 5B, the exterior side surfaces 188 of the first portion 120 are in contact with walls 190 of the opening 100 formed in the pressure tank 80.

As shown in FIG. 5B, the plug seal 126 is coupled to the removable plug element 118 at the opening 100, to provide a further sealing of the opening 100 when the removable plug element 118 is inserted and fitted within the opening 100. As shown in FIG. 5B, the plug seal 126 surrounds the base 121 of the first portion 120 and is seated against the top surface portions 123 of the second portion 122.

FIG. 5B further shows the membrane seal 132 comprising a first portion 193*a*, a second portion 193*b*, a flexible body 194 formed between the first portion 193*a* and the second portion 193*b*, an inner surface 195, and an outer surface 196. A similar arrangement exists in the pressure tank 80 longitudinal direction in addition to the pressure tank 80 circumferential direction shown in FIG. 5B. As shown in FIG. 5B, the inner surface 195 of the membrane seal 132 is positioned over, and adjacent to, a bottom end 198 and sides 200 of the second portion 122, such as the inner portion 122*a*, of the removable plug element 118, and is positioned over, and adjacent to, outer sides 126*a* of the plug seal 126. In this version, as shown in FIG. 5B, the membrane seal 132 covers the second portion 122 of the removable plug element 118, and covers the plug seal 126. As shown in FIG. 5B, the inner surface 195 of the membrane seal 132 at the first portion 193*a* and at the second portion 193*b* is coupled to, and positioned adjacent to, locations 130*b* on the pressure tank inner surface 112*b*. The membrane seal 132 is coupled to the pressure tank inner surface 112*b* with an attachment element such as adhesive or another suitable attachment element. Preferably, the membrane seal 132 is configured to be torn to allow the removable plug element 118 to be pulled through the membrane seal 132, when the removable plug element 118 is released from the opening 100.

A sealant 128 (see FIG. 4B), such as an adhesive sealant, may optionally be applied to one or more surfaces of the plug seal 126 and/or applied to one or more locations 130*a* (see FIGS. 4B, 5B) on the pressure tank inner surface 112*b* at the opening 100, to seal at the opening 100 and at the removable plug element 118 contacting the opening 100. Alternatively, the sealant 128, such as the adhesive sealant, may be used instead of the plug seal 126, to seal at and around the opening 100 and at and around the removable plug element 118 at the one or more locations 130*a* (see FIGS. 4B, 5B) of the pressure tank inner surface 112*b*. As a further alternative, the membrane seal 132 (see FIG. 5B) may be used alone, without the plug seal 126 (see FIG. 5B) or the sealant 128 (see FIG. 4B).

FIG. 5B further shows the second end 146*b* of the cable 145 attached to a portion 196*a* of the outer surface 196 of the membrane seal 132. Alternatively, the second end 146*b* of the cable 145 is fitted through an opening in the membrane seal 132 and attached to the bottom end 198 of the second portion 122. FIG. 5B further shows the vacuum tank 50, and the vacuum cavity 166 and the gap 168 formed between the vacuum tank inner surface 114*b* of the vacuum tank 50 and the pressure tank outer surface 112*a* of the pressure tank 80. FIG. 5B further shows the air 78, such as the ambient air 78*a*, outside the vacuum tank 50.

Figure 6A:
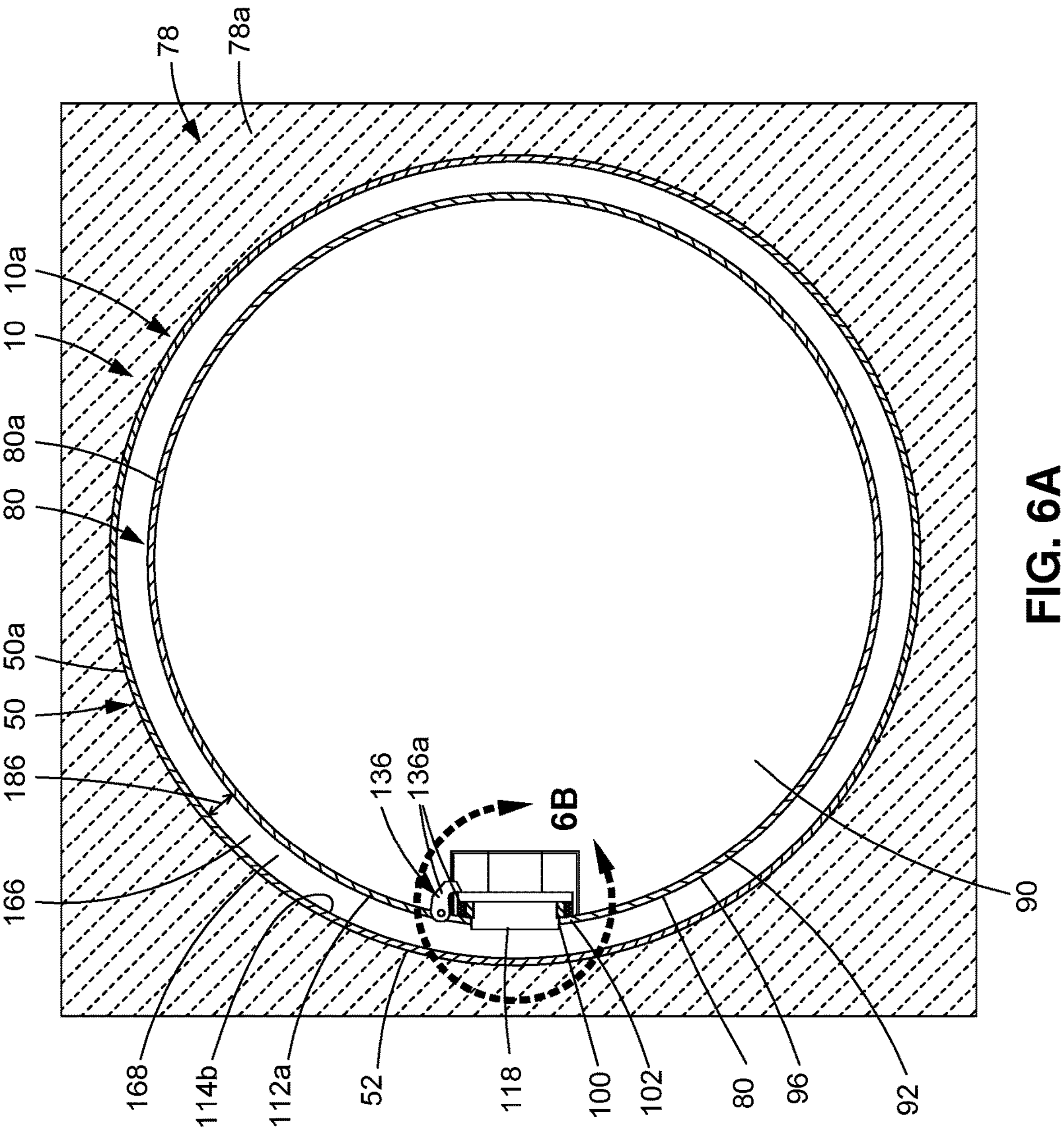
FIG. 6A is an illustration of a cross-sectional front view of an exemplary tank system of the disclosure, showing yet another version of a removable plug assembly with one removable plug element and another version of a retraction mechanism.

Now referring to FIG. 6A, FIG. 6A is an illustration of a cross-sectional front view of an exemplary tank system 10, such as the vacuum jacketed tank system 10*a*, of the disclosure, showing yet another version of a removable plug assembly 116 with one (1) removable plug element 118 with a plug seal 126 and another version of a retraction mechanism 136 in the form of a latch spring retraction mechanism 136*a* positioned within the interior 90 of the pressure tank 80. Like the tank system 10 in FIGS. 4A, 5A, as shown in FIG. 6A, the tank system 10, such as the vacuum jacketed tank system 10*a*, comprises the vacuum tank 50, such as the external vacuum tank 50*a*, the pressure tank 80, such as the internal pressure tank 80*a*, mounted within the vacuum tank 50, and the vacuum cavity 166 and the gap 168 formed between the vacuum tank inner surface 114*b* of the vacuum tank 50 and the pressure tank outer surface 112*a* of the pressure tank 80. As shown in FIG. 6A, the gap 168 has the width 186 from the vacuum tank inner surface 114*b* to the pressure tank outer surface 112*a*, and the width 186 of the gap 168 is constant and uniform between the vacuum tank 50 and the pressure tank 80. FIG. 6A shows the air 78, such as ambient air 78*a*, surrounding the exterior 52 of the vacuum tank 50. In this version, the pressure tank 80 has one (1) opening 100 (see FIG. 6A) formed through the pressure tank skin 96 at location 102 on the pressure tank main portion 92.

Figure 6B:
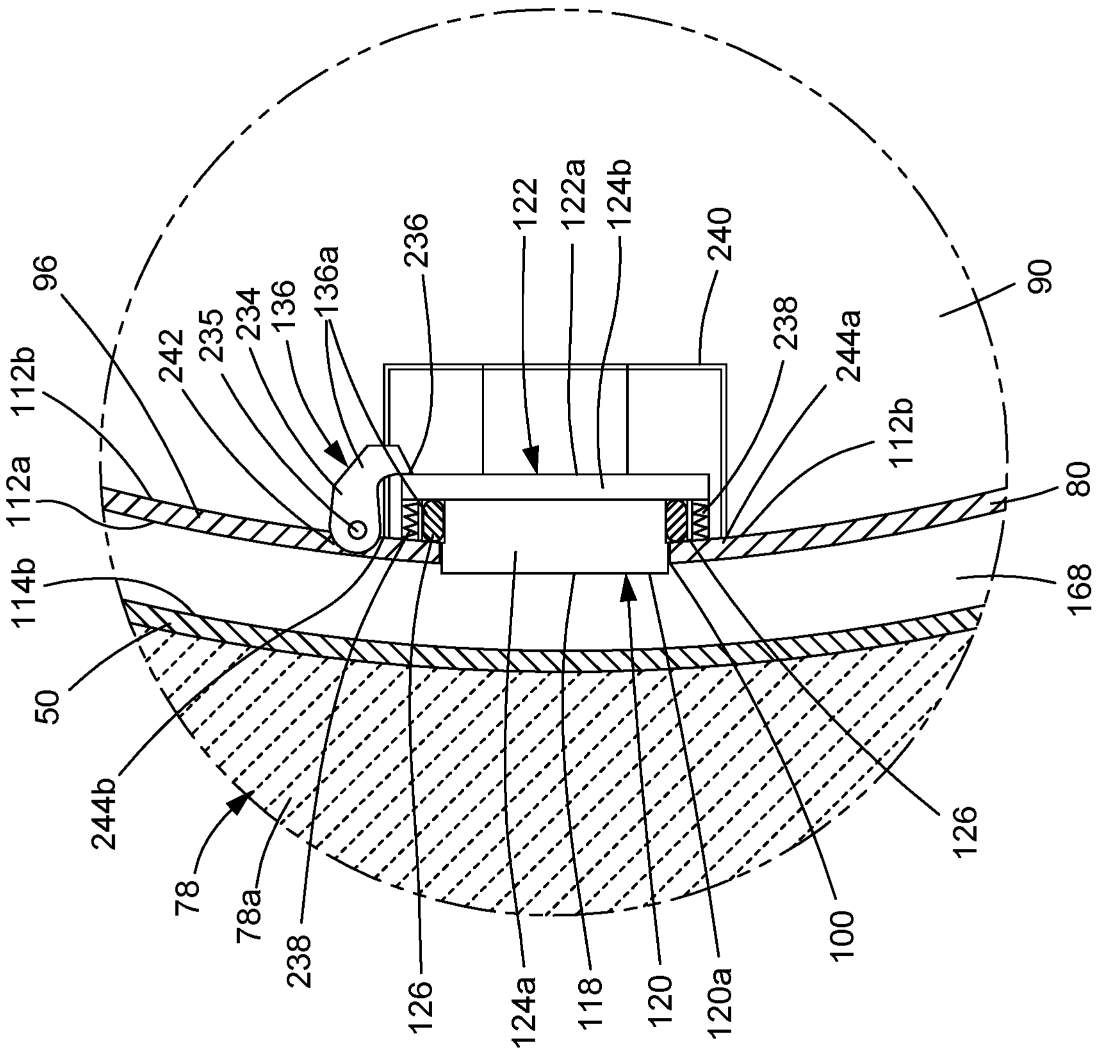
FIG. 6B is an illustration of a cross-sectional enlarged front view of the removable plug element and the retraction mechanism of the circle 6B of FIG. 6A.

Now referring to FIG. 6B, FIG. 6B is an illustration of a cross-sectional enlarged front view of the removable plug element 118 and the retraction mechanism 136, such as in the form of the latch spring retraction mechanism 136*a*. In this version, as shown in FIG. 6B, the latch spring retraction mechanism 136*a* comprises a latch member 234 that pivots around a pivot pin 235, and the latch member 234 has a latch hook portion 236 configured to couple to the removable plug element 118. As shown in FIG. 6B, the latch member 234 is coupled, or attached, to a portion 242 of the pressure tank inner surface 112*b*. The retraction mechanism 136, such as the latch spring retraction mechanism 136*a*, is coupled, or attached, to the removable plug element 118 via the latch hook portion 236 of the latch member 234. As further shown in FIG. 6B, the latch spring retraction mechanism 136*a* comprises one or more springs 238 coupled to the removable plug element 118, such as to the second portion 122, such as the inner portion 122*a*. The retraction mechanism 136, such as the latch spring retraction mechanism 136*a*, is configured to pull the removable plug element 118 away from, and out of, the opening 100 during the emergency condition 152 (see FIG. 2). FIG. 6B further shows a plug retention cage 240 in the interior 90 of the pressure tank 80. As shown in FIG. 6B, the plug retention cage 240 is coupled, or attached, to portions 244*a*, 244*b*, of the pressure tank inner surface 112*b* and positioned around the removable plug element 118, such as the second portion 122, for example, the inner portion 122*a*, of the removable plug element 118.

As further shown in FIG. 6B, the removable plug element 118 comprises the first portion 120, such as the outer portion 120*a*, having the cylindrical body 124*a*, and the second portion 122, such as the inner portion 122*a*, coupled to, or integral with, the first portion 120, such as the outer portion 120*a*, and having the cylindrical body 124*b*. FIG. 6B further shows the plug seal 126 coupled to the removable plug element 118 at the opening 100 formed through the pressure tank skin 96, to provide a sealing of the opening 100 when the removable plug element 118 is inserted and fitted within the opening 100. As shown in FIG. 6B, the plug seal 126 surrounds the first portion 120 and is seated against the second portion 122. FIG. 6B further shows the gap 168 formed between the vacuum tank inner surface 114*b* of the vacuum tank 50 and the pressure tank outer surface 112*a* of the pressure tank 80. FIG. 6B further shows the air 78, such as ambient air 78*a*, outside the vacuum tank 50.

Figure 7:
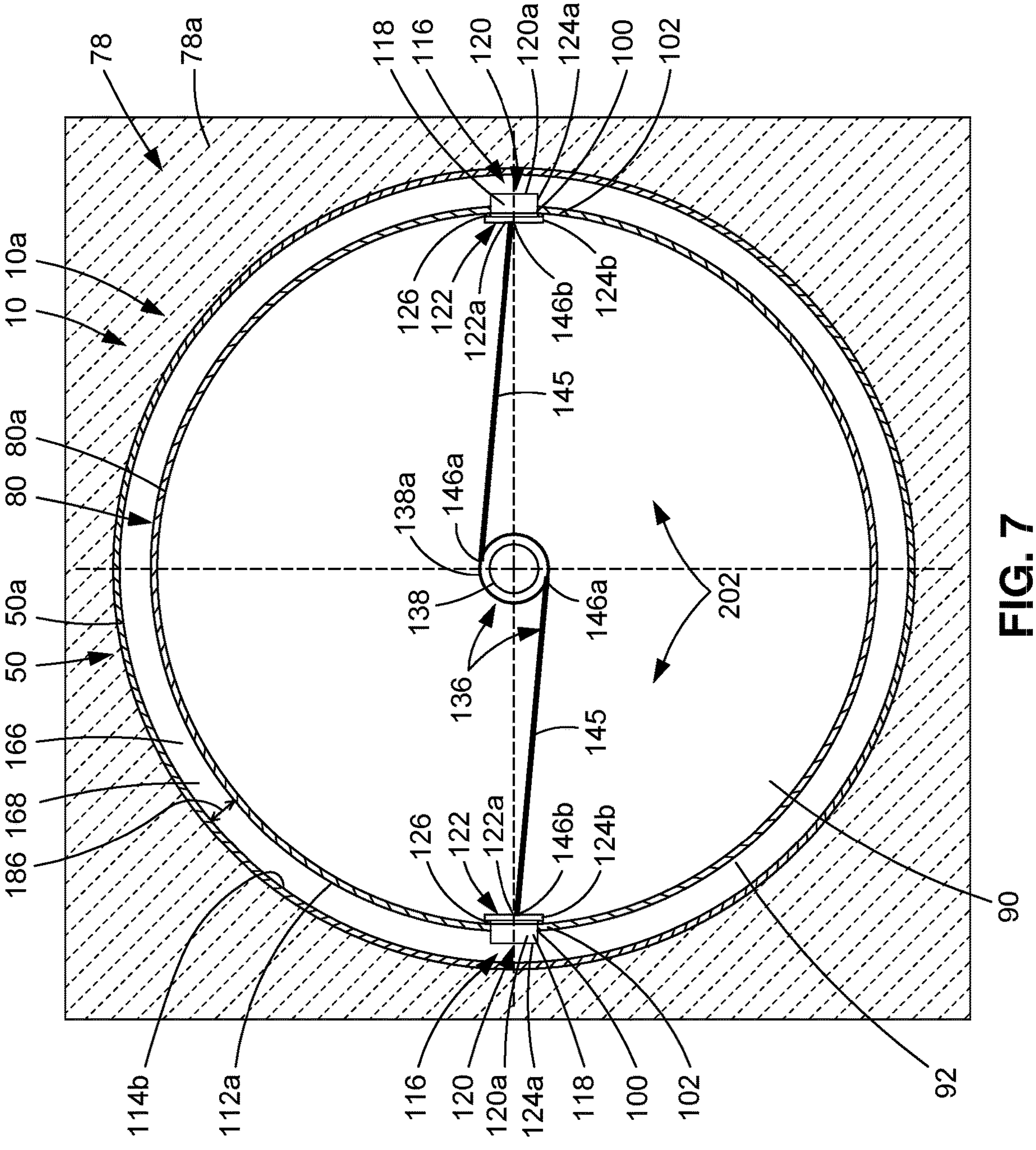
FIG. 7 is an illustration of a cross-sectional front view of an exemplary tank system of the disclosure, showing yet another version of a removable plug assembly with two removable plug elements.

Now referring to FIG. 7, FIG. 7 is an illustration of a cross-sectional front view of an exemplary tank system 10, such as the vacuum jacketed tank system 10*a*, of the disclosure, showing yet another version of the removable plug assembly 116 with two (2) removable plug elements 118, each with the plug seal 126. Like the tank system 10 in FIGS. 4A, 5A, 6, as shown in FIG. 7, the tank system 10, such as the vacuum jacketed tank system 10*a*, comprises the vacuum tank 50, such as the external vacuum tank 50*a*, the pressure tank 80, such as the internal pressure between the vacuum tank inner surface 114*b* of the vacuum tank 50 and the pressure tank outer surface 112*a* of the pressure tank 80. As shown in FIG. 7, the gap 168 has the width 186 from the vacuum tank inner surface 114*b* to the pressure tank outer surface 112*a*, and the width 186 of the gap 168 is constant and uniform between the vacuum tank 50 and the pressure tank 80. FIG. 7 shows the air 78, such as ambient air 78*a*, surrounding the exterior 52 of the vacuum tank 50.

In this version, the pressure tank 80 has two (2) openings 100 (see FIG. 7) formed through the pressure tank skin 96 at locations 102 on the pressure tank main portion 92. As shown in FIG. 7, the pressure tank 80 further comprises the retraction mechanism 136 positioned within the interior 90 of the pressure tank 80, where the retraction mechanism 136 comprises the central rotatable tube 138, two (2) cables 145, and the actuator 144 (see FIG. 3B). The retraction mechanism 136 is coupled, or attached, to the removable plug elements 118 via the cables 145. Each cable 145 has the first end 146*a* (see FIG. 7) attached to the central rotatable tube 138 and the second end 146*b* (see FIG. 7) attached to the removable plug element 118. When the central rotatable tube 138 is rotated by the actuator 144 (see FIG. 3B), the cables 145 attached to the removable plug elements 118 start winding around an exterior 138*a* (see FIG. 7) of the central rotatable tube 138. This puts tension into the cables 145. The retraction mechanism 136 is configured to pull the removable plug elements 118 away from, and out of, the openings 100 during the emergency condition 152 (see FIG. 2).

As further shown in FIG. 7, each removable plug element 118 comprises the first portion 120, such as the outer portion 120*a*, having the cylindrical body 124*a*, and the second portion 122, such as the inner portion 122*a*, coupled to, or integral with, the first portion 120, such as the outer portion 120*a*. The second portion 122 has the cylindrical body 124*b* (see FIG. 7). As shown in FIG. 7, in this version, the two (2) removable plug elements 118 are positioned opposite each other in an opposing position 202.

Figure 8:
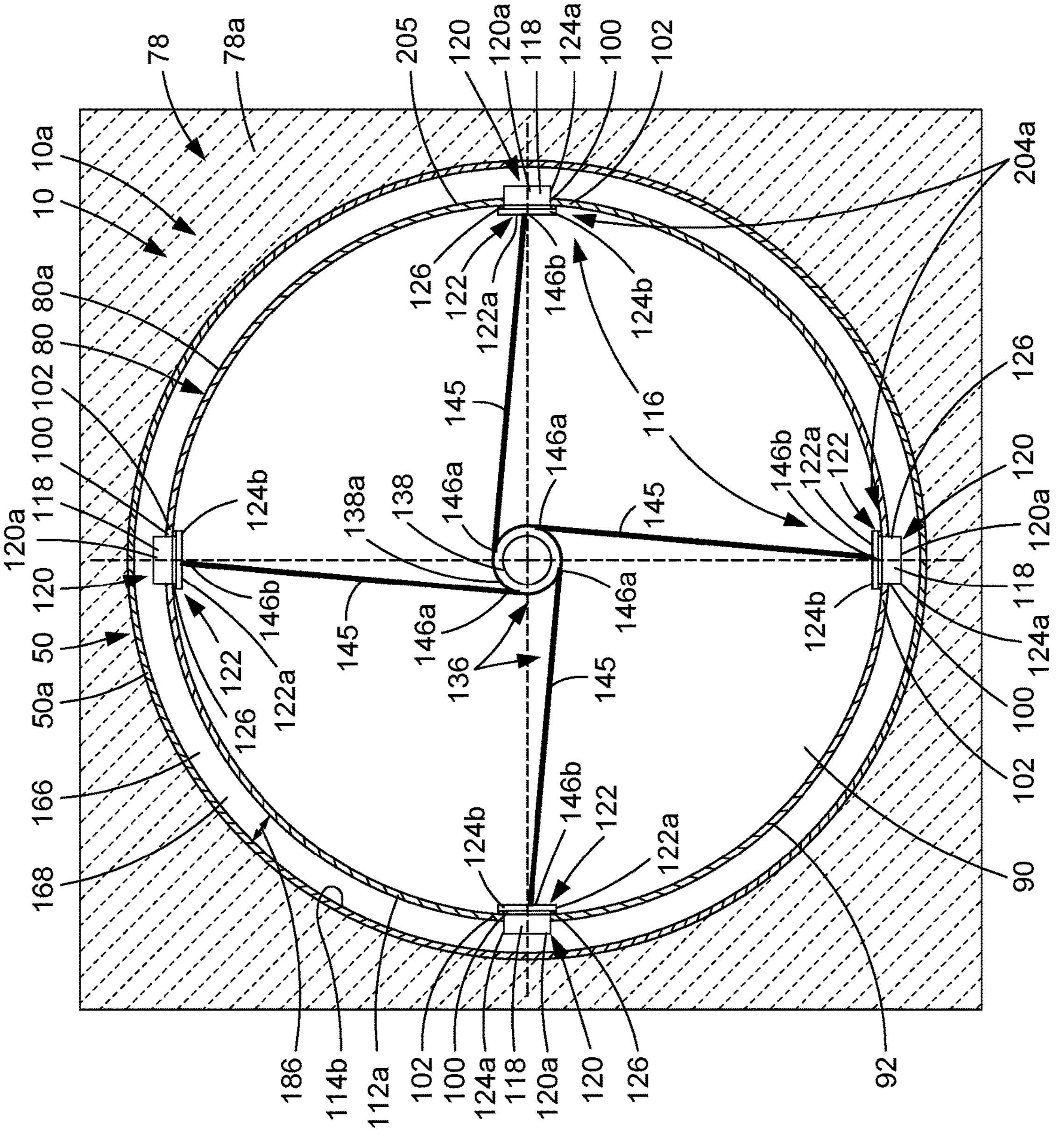
FIG. 8 is an illustration of a cross-sectional front view of an exemplary tank system of the disclosure, showing yet another version of a removable plug assembly with four removable plug elements.

Now referring to FIG. 8, FIG. 8 is an illustration of a cross-sectional front view of an exemplary tank system 10, such as the vacuum jacketed tank system 10*a*, of the disclosure, showing yet another version of the removable plug assembly 116 with four (4) removable plug elements 118, each with the plug seal 126. Like the tank system 10 in FIGS. 4A, 5A, 6, 7, as shown in FIG. 8, the tank system 10, such as the vacuum jacketed tank system 10*a*, comprises the vacuum tank 50, such as the external vacuum tank 50*a*, the pressure tank 80, such as the internal pressure between the vacuum tank inner surface 114*b* of the vacuum tank 50 and the pressure tank outer surface 112*a* of the pressure tank 80. As shown in FIG. 8, the gap 168 has the width 186 from the vacuum tank inner surface 114*b* to the pressure tank outer surface 112*a*, and the width 186 of the gap 168 is constant and uniform between the vacuum tank 50 and the pressure tank 80. FIG. 8 shows the air 78, such as ambient air 78*a*, surrounding the exterior 52 of the vacuum tank 50.

In this version, the pressure tank 80 has four (4) openings 100 (see FIG. 7) formed through the pressure tank skin 96 at locations 102 on the pressure tank main portion 92. As shown in FIG. 8, the pressure tank 80 further comprises the retraction mechanism 136 positioned within the interior 90 of the pressure tank 80, where the retraction mechanism 136 comprises the central rotatable tube 138, four (4) cables 145, and the actuator 144 (see FIG. 3B). The retraction mechanism 136 is coupled, or attached, to the removable plug elements 118 via the cables 145. Each cable 145 has the first end 146*a* (see FIG. 8) attached to the central rotatable tube 138 and the second end 146*b* (see FIG. 8) attached to the removable plug element 118. When the central rotatable tube 138 is rotated by the actuator 144, the cables 145 attached to the removable plug elements 118 start winding around an exterior 138*a* (see FIG. 3B) of the central rotatable tube 138. This puts tension into the cables 145. The retraction mechanism 136 is configured to pull the removable plug elements 118 away from, and out of, the openings 100 during the emergency condition 152 (see FIG. 2).

As further shown in FIG. 8, each removable plug element 118 comprises the first portion 120, such as the outer portion 120*a*, having the cylindrical body 124*a*, and the second portion 122, such as the inner portion 122*a*, coupled to, or integral with, the first portion 120, such as the outer portion 120*a*. The second portion 122 has the cylindrical body 124*b* (see FIG. 8). As shown in FIG. 8, in this version, the four (4) removable plug elements 118 are spaced apart from each other in an equal distance spaced relationship 204*a* around the perimeter 205 of the pressure tank 80.

Now referring to FIGS. 9A-9H, FIGS. 9A-9H show an activation sequence 206 with various positions 208 of a version of the removable plug assembly 116 disposed in the pressure tank 80, such as the internal pressure tank 80*a*, which is mounted within the vacuum tank 50, such as the external vacuum tank 50*a*, of the tank system 10, such as the vacuum jacketed tank system 10*a* of the disclosure. FIGS. 9A-9H show the tank system 10, such as the vacuum jacketed tank system 10*a*, comprising the vacuum tank 50, such as the external vacuum tank 50*a*, the pressure tank 80, such as the internal pressure tank 80*a*, mounted within the vacuum tank 50, and the vacuum cavity 166 and the gap 168 formed between the vacuum tank inner surface 114*b* of the vacuum tank 50 and the pressure tank outer surface 112*a* of the pressure tank 80. FIGS. 9A-9H further show the pressure tank 80 with six (6) openings 100 formed through the pressure tank skin 96 at locations 102 (see FIG. 9A) on the pressure tank main portion 92 (see FIG. 9A), and show six (6) removable plug elements 118. FIGS. 9A-9H further show the retraction mechanism 136 positioned within the interior 90 of the pressure tank 80, and further show the central rotatable tube 138 and six (6) cables 145 of the retraction mechanism 136.

For clarity, FIGS. 9A-9H do not show the plug seals 126 (see FIG. 4B) and the membrane seals 132 (see FIG. 5B) coupled to the removable plug elements 118, and do not show the sealant 128 (see FIG. 4B). However, the plug seals 126 and/or the membrane seals 132 and/or the sealant 128 may be used with the removable plug elements 118 in the tank system 10 shown in FIGS. 9A-9H.

Figure 9A:
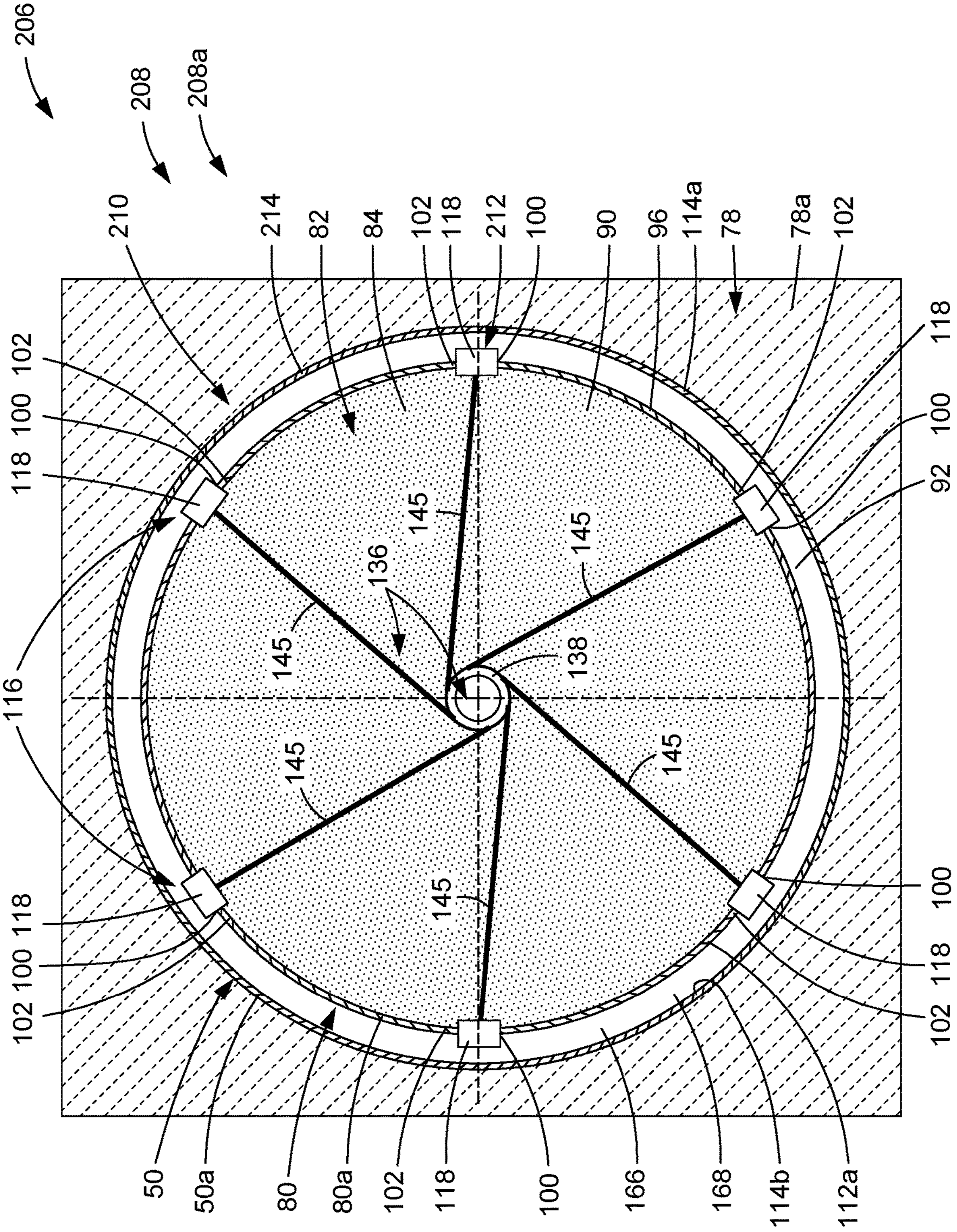
FIG. 9A is an illustration of a cross-sectional front view of an exemplary tank system of the disclosure, showing a version of a removable plug assembly with six removable plug elements, and showing a first position of a removable plug assembly activation sequence.

FIG. 9A is an illustration of a cross-sectional front view of the exemplary tank system 10, such as the vacuum jacketed tank system 10*a*, showing the removable plug assembly 116 with six (6) removable plug elements 118, and showing a first position 208*a* of the activation sequence 206. As shown in the first position 208*a* in FIG. 9A, the tank system 10 is in an intact configuration 210, and shows all of the six (6) removable plug elements 118 inserted, fitted within, and plugging the six (6) openings 100, respectively, formed through the pressure tank skin 96 at locations 102 on the pressure tank main portion 92. As shown in FIG. 9A, the six (6) removable plug elements 118 are in a plugged position 212.

As shown in FIG. 9A, the pressure tank 80 contains the cryogenic fluid 82, such as the liquid hydrogen 84, within the interior 90 of the pressure tank 80. The removable plug elements 118 function in a similar manner to the pressure tank skin 96 (see FIG. 9A) in that the removable plug elements 118 form the surface that contains the cryogenic fluid 82, such as the liquid hydrogen 84.

As shown in FIG. 9A, the vacuum tank 50, such as the external vacuum tank 50*a*, provides a barrier 214 between the air 78, such as the ambient air 78*a*, and the vacuum cavity 166. The vacuum tank 50 is designed to withstand the external pressure loading, which is a result of the pressure of the air 78, such as the ambient air 78*a*, acting on the vacuum tank outer surface 114*a* (see FIG. 9A), and nothing on the vacuum tank inner surface 114*b*. The vacuum cavity 166 forming the gap 168 between the pressure tank 80 and the vacuum tank 50 limits the thermal transfer between the cryogenic fluid 82, such as the liquid hydrogen 84, and the air 78, such as the ambient air 78*a*.

Figure 9B:
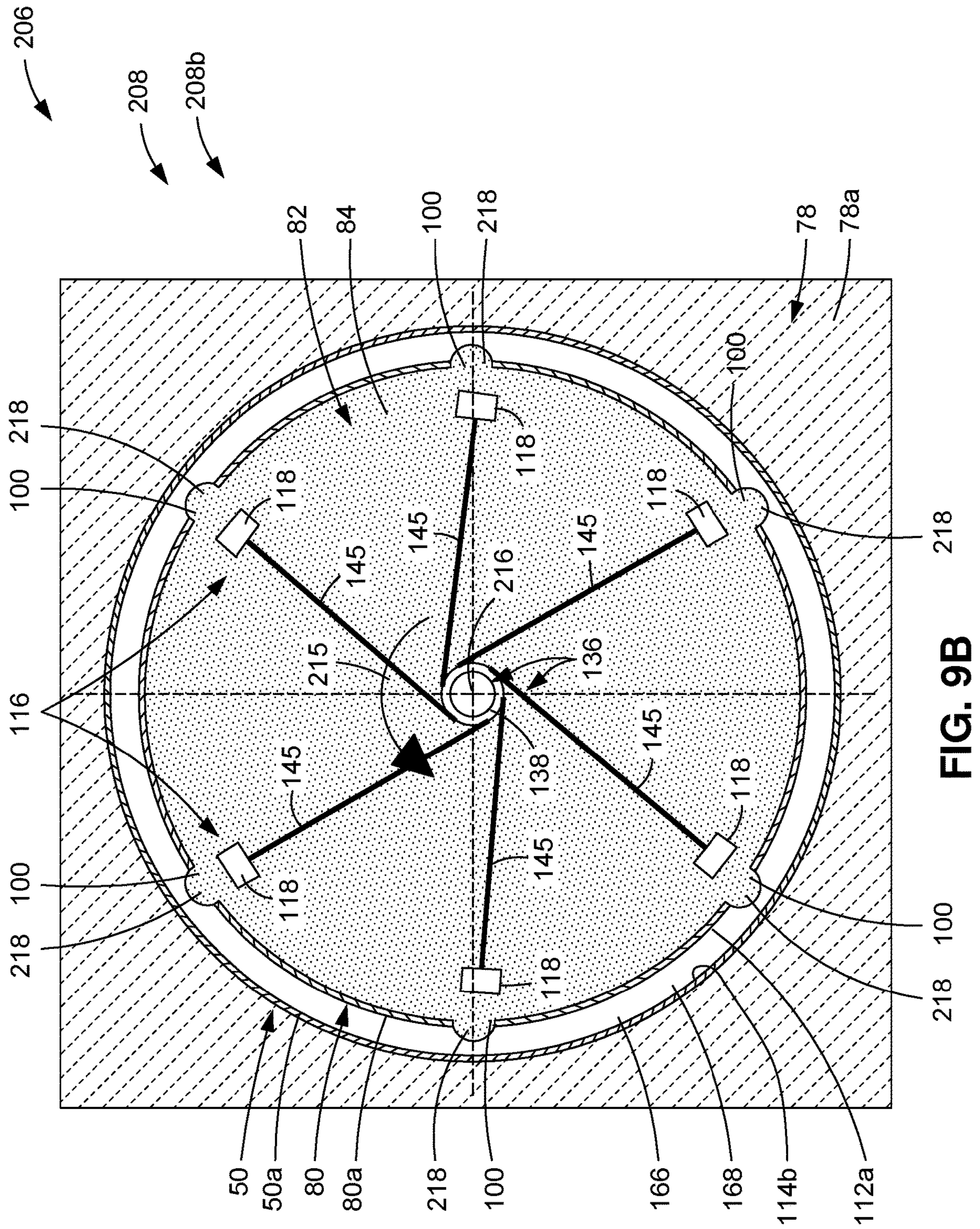
FIG. 9B is an illustration of a cross-sectional front view of the tank system with removable plug assembly of FIG. 9A, showing a second position of the removable plug assembly activation sequence.

FIG. 9B is an illustration of a cross-sectional front view of the tank system 10, such as the vacuum jacketed tank system 10*a*, with removable plug assembly 116 of FIG. 9A, showing a position 208, such as a second position 208*b*, of the activation sequence 206. As shown in the second position 208*b* in FIG. 9B, the retraction mechanism 136 is activated when an emergency condition 152 (see FIG. 2) occurs. As shown in FIG. 2, the emergency condition 152 comprises one of, an emergency landing 154 of an aircraft 14, a forced landing 155 of an aircraft 14, the pressure tank 80 experiencing an elevated acceleration level 156 of acceleration 157 of the aircraft 14, the pressure tank 80 experiencing an elevated force level 158 of force 159, and an event 160 causing a breach 162 or a potential breach 162*a* of the vacuum tank 50, and/or causing an airflow 164 or a potential airflow 164*a* of the air 78, such as the ambient air 78*a*, into the pressure tank 80. The retraction mechanism 136 is activated with an activation system 150 (see FIG. 2) comprising one of, an automatic activated activation system 150*a* (see FIG. 2), or an operator activated activation system 150*b*, such as a pilot activated activation system 150*c* (see FIG. 2), when the structure 12 comprises an aircraft 14.

Activation of the retraction mechanism 136 causes the actuator 144 (see FIGS. 2, 3B) to rotate the central rotatable tube 138 (see FIG. 9B) in a rotation direction 215 (see FIG. 9B), such that the cables 145 attached to the central rotatable tube 138 start winding around the central rotatable tube 138. This puts tension into the cables 145, and as the cables 145 wind around the central rotatable tube 138, the cables 145 attached to the removable plug elements 118 pull removable plug elements 118 away from the openings 100, so that the removable plug elements 118 are released from the openings 100.

As shown in FIG. 9B, the rotation of the central rotatable tube 138 in the rotation direction 215 and the winding of the cables 145 around the central rotatable tube 138 pull the removable plug elements 118 towards a center 216 of the pressure tank 80. Due to the enforced shortening of the distance between the removable plug elements 118 and the tangent to the central rotatable tube 138, the removable plug elements 118 are pulled into the interior 90 of the pressure tank 80 towards the center 216 of the pressure tank 80, thus pulling the removable plug elements 118 away from their respective openings 100. With the openings 100 that were previously filled by the removable plug elements 118 now open, the cryogenic fluid 82, such as the liquid hydrogen 84, starts to flow into the vacuum cavity 166. FIG. 9B shows an outflow 218 of the cryogenic fluid 82, such as the liquid hydrogen 84, from the interior 90 of the pressure tank 80 through the openings 100 and into the vacuum cavity 166.

Figure 9C:
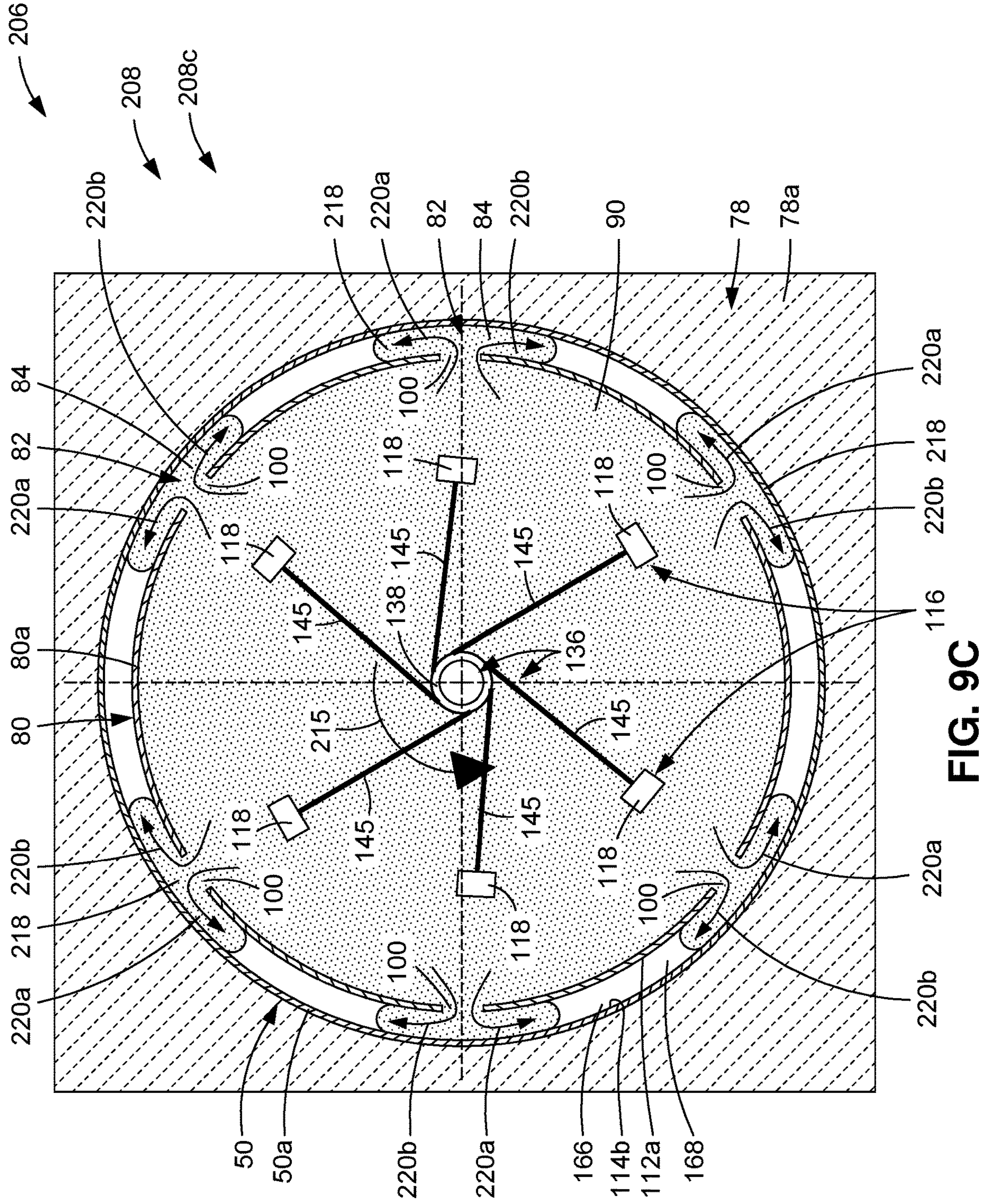
FIG. 9C is an illustration of a cross-sectional front view of the tank system with removable plug assembly of FIG. 9A, showing a third position of the removable plug assembly activation sequence.

FIG. 9C is an illustration of a cross-sectional front view of the tank system 10, such as the vacuum jacketed tank system 10*a*, with the removable plug assembly 116 of FIG. 9A, showing a position 208, such as a third position 208*c*, of the activation sequence 206. As shown in FIG. 9C. the retraction mechanism 136 is still activated and the actuator 144 (see FIGS. 2, 3B) is still rotating the central rotatable tube 138 in the rotation direction 215 to further wind the cables 145 around the central rotatable tube 138, and to further pull the removable plug elements 118 further away from the openings 100, so that the removable plug elements 118 do not interfere with the free flow of the cryogenic fluid 82, such as the liquid hydrogen 84, through the openings 100. As shown in FIG. 9C, in the third position 208*c*, the removable plug elements 118 are pulled further away from the openings 100, as compared to the position of the removable plug elements 118 in the second position 208*b* (see FIG. 9B).

FIG. 9C shows the cryogenic fluid 82, such as the liquid hydrogen 84, continuing to flow from the interior 90 of the pressure tank 80 through the openings 100 and into the vacuum cavity 166. FIG. 9C shows further outflow 218 of the cryogenic fluid 82, such as the liquid hydrogen 84, from the interior 90 of the pressure tank 80 through the openings 100 and into the vacuum cavity 166. FIG. 9C shows the cryogenic fluid 82, such as the liquid hydrogen 84, flowing in a first outflow direction 220*a*, such as a left direction, out of each opening 100 into the vacuum cavity 166, and flowing in a second outflow direction 220*b*, such as a right direction, out of each opening 100 into the vacuum cavity 166. As shown in FIG. 9C, in the third position 208*c*, the volume of the vacuum cavity 166 is approximately half-filled with the cryogenic fluid 82, such as the liquid hydrogen 84.

Figure 9D:
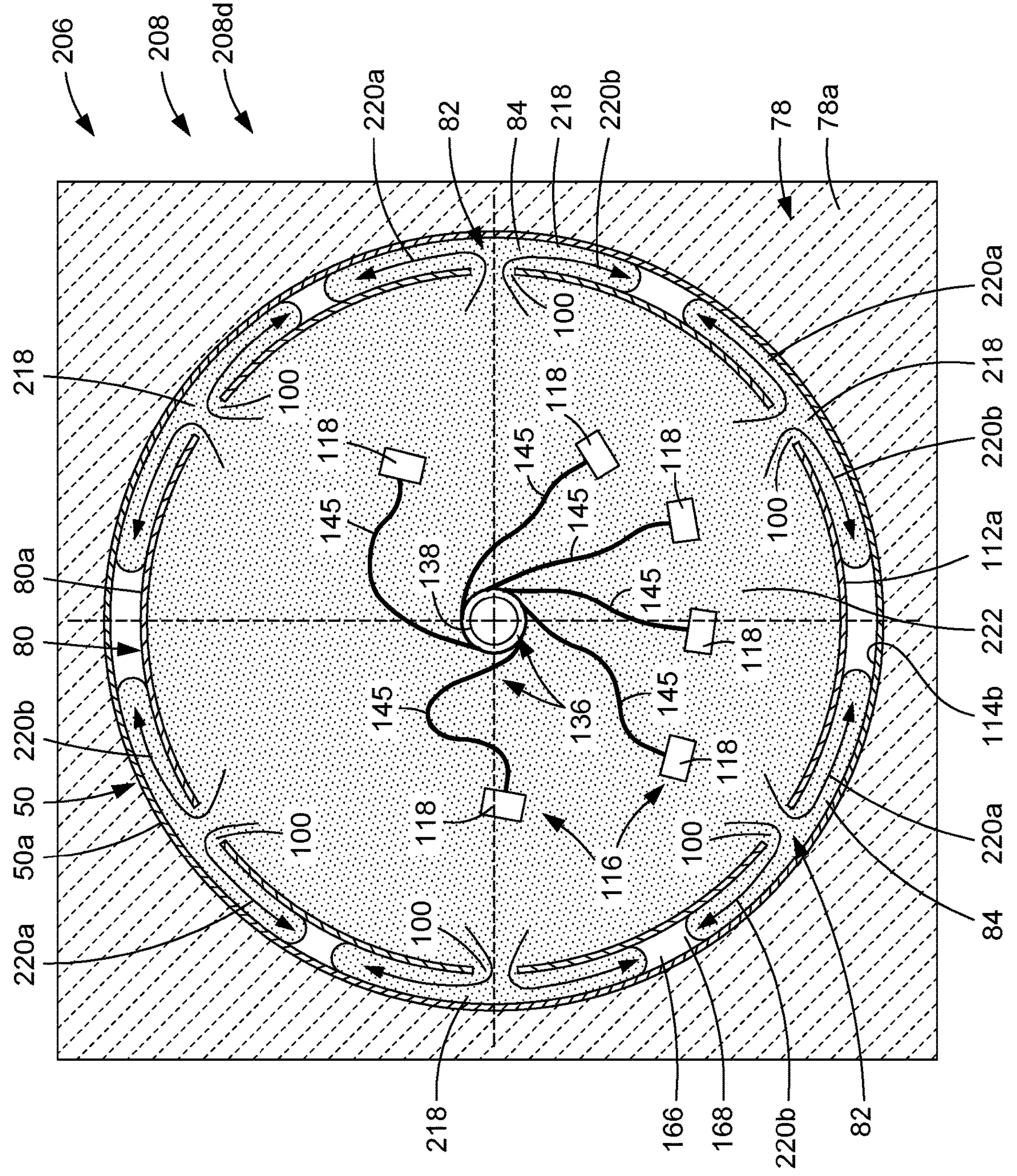
FIG. 9D is an illustration of a cross-sectional front view of the tank system with removable plug assembly of FIG. 9A, showing a fourth position of the removable plug assembly activation sequence.

FIG. 9D is an illustration of a cross-sectional front view of the tank system 10, such as the vacuum jacketed tank system 10*a*, with the removable plug assembly 116 of FIG. 9A, showing a position 208, such as a fourth position 208*d*, of the activation sequence 206. As shown in FIG. 9D, the cryogenic fluid 82, such as the liquid hydrogen 84, continues to flow from the interior 90 of the pressure tank 80 through the openings 100 and into the vacuum cavity 166. FIG. 9D shows even further outflow 218 of the cryogenic fluid 82, such as the liquid hydrogen 84, from the interior 90 of the pressure tank 80 through the openings 100 and into the vacuum cavity 166. FIG. 9D shows the cryogenic fluid 82, such as the liquid hydrogen 84, further flowing in the first outflow direction 220*a*, such as the left direction, out of each opening 100 into the vacuum cavity 166, and further flowing in the second outflow direction 220*b*, such as the right direction, out of each opening 100 into the vacuum cavity 166. As shown in FIG. 9D, in the fourth position 208*d*, the volume of the vacuum cavity 166 is almost completely filled with the cryogenic fluid 82, such as the liquid hydrogen 84.

As shown in FIG. 9D, the retraction mechanism 136 has stopped and the central rotatable tube 138 has stopped rotating. The removable plug elements 118 have performed their function of unplugging the openings 100 to release the cryogenic fluid 82, such as the liquid hydrogen 84, into the vacuum cavity 166. As shown in FIG. 9D, in the fourth position 208*d*, the removable plug elements 118 now begin to sink towards a bottom area 222 of the pressure tank 80.

Figure 9E:
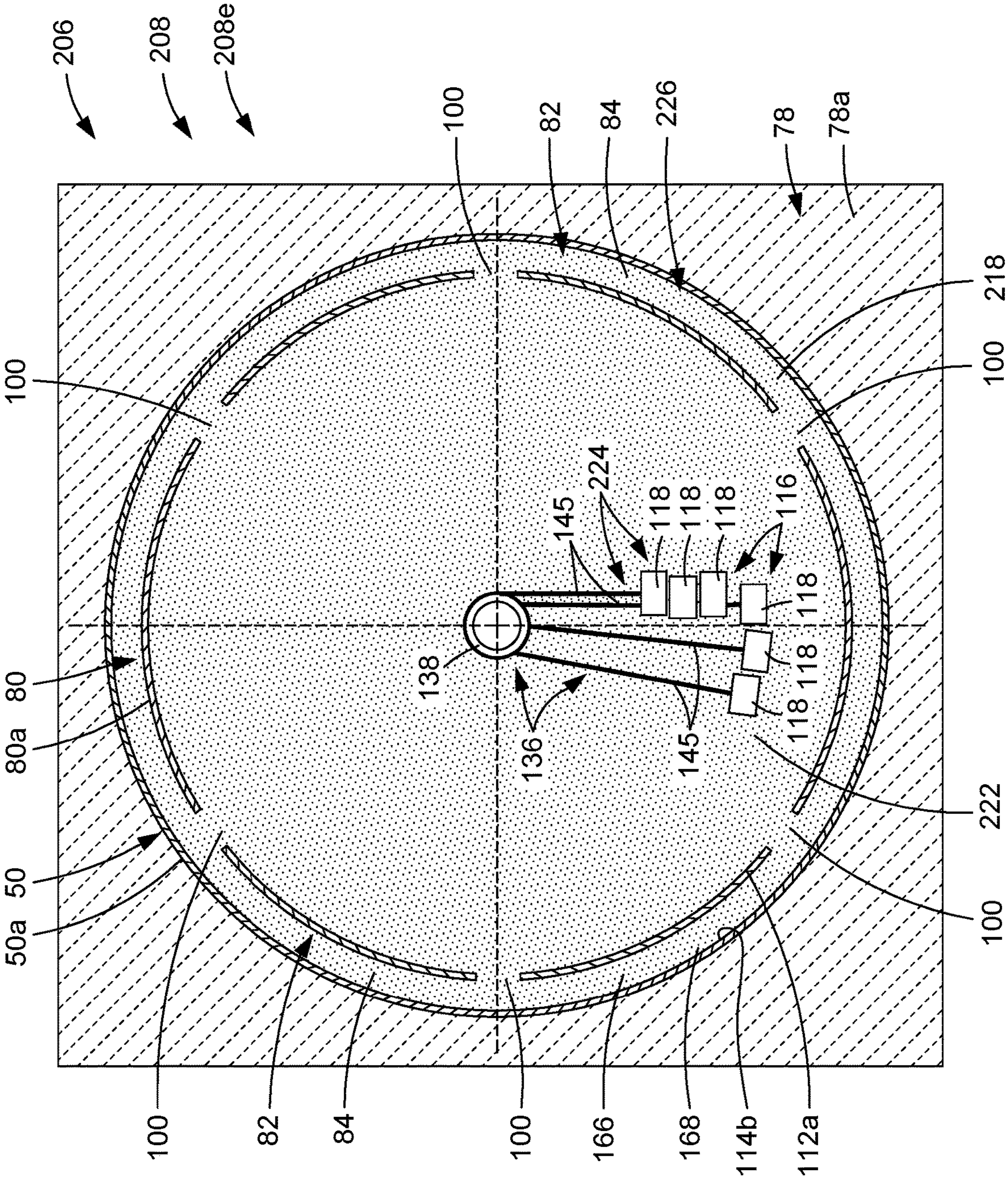
FIG. 9E is an illustration of a cross-sectional front view of the tank system with removable plug assembly of FIG. 9A, showing a fifth position of the removable plug assembly activation sequence.

FIG. 9E is an illustration of a cross-sectional front view of the tank system 10, such as the vacuum jacketed tank system 10*a*, with the removable plug assembly 116 of FIG. 9A, showing a position 208, such as a fifth position 208*e*, of the activation sequence 206. As shown in FIG. 9E, the operation of the retraction mechanism 136 is completed, and having performed their function, the cables 145 and removable plug elements 118 are in an inactive condition 224 and hang from the central rotatable tube 138 at the bottom area 222 of the pressure tank 80. The tank system 10 is designed such that in the inactive condition 224, the cables 145 and the removable plug elements 118 do not interfere with any outflow 218 (see FIG. 9E) of the cryogenic fluid 82, such as the liquid hydrogen 84, out of the pressure tank 80 and through the openings 100, if the vacuum tank 50 is breached.

As shown in FIG. 9E, in the fifth position 208*e*, the volume of the vacuum cavity 166 is completely filled with the cryogenic fluid 82, such as the liquid hydrogen 84, and the vacuum cavity 166 is in a filled condition 226. The vacuum cavity 166 in the filled condition 226 is advantageous because the air 78 (see FIG. 9E), such as the ambient air 78*a* (see FIG. 9E), has no place to flow if the vacuum tank 50 is breached. Since there is now no insulative layer between the cryogenic fluid 82, such as the liquid hydrogen 84, and the air 78, such as the ambient air 78*a*, the cryogenic fluid 82, such as the liquid hydrogen 84, will boil at a rapid rate. Where the tank system 10 is in a structure 12 (see FIG. 1) comprising an aircraft 14 (see FIG. 1), this situation is acceptable, since the aircraft 14 is no longer in normal operations, but is in an emergency condition 152 (see FIG. 2) or situation where thermal efficiency is no longer important. Even though the boiling rate is rapid, it is not rapid enough to eliminate the cryogenic fluid 82, such as the liquid hydrogen 84, from the aircraft 14 quickly enough in an emergency condition 152, for example, an emergency landing 154 (see FIG. 2) or a forced landing 155 (see FIG. 2) where a crash may be imminent.

Figure 9F:
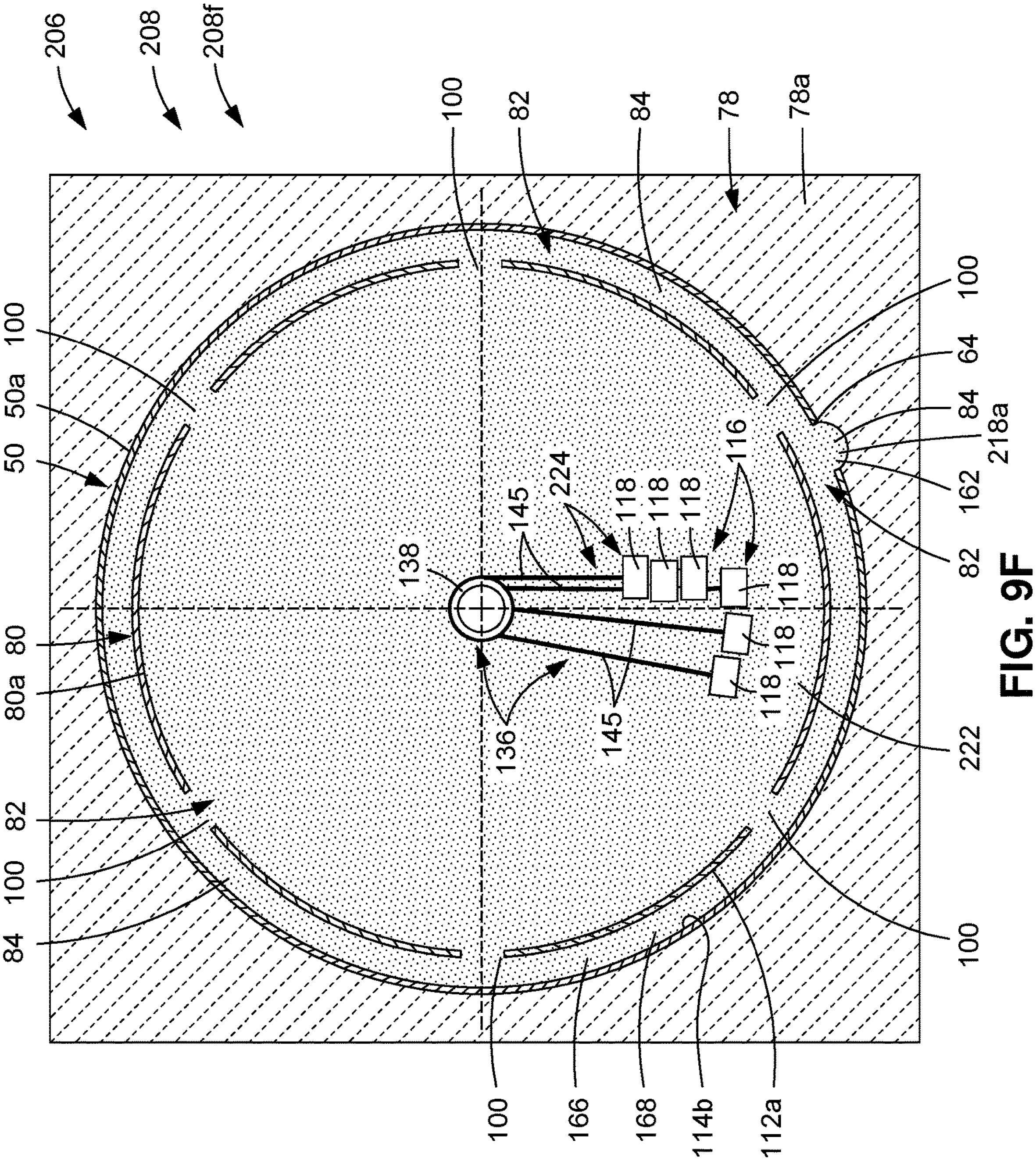
FIG. 9F is an illustration of a cross-sectional front view of the tank system with removable plug assembly of FIG. 9A, showing a sixth position of the removable plug assembly activation sequence.

FIG. 9F is an illustration of a cross-sectional front view of the tank system 10, such as the vacuum jacketed tank system 10*a*, with the removable plug assembly 116 of FIG. 9A, showing a position 208, such as a sixth position 208*f*, of the activation sequence 206. As shown in FIG. 9F, there is a breach 162 in the vacuum tank wall 64 of the vacuum tank 50 that occurred during the emergency condition 152 (see FIG. 2), such as for the aircraft 14, the emergency landing 154 (see FIG. 2) or the forced landing 155 (see FIG. 2), or another emergency condition 152. As shown in FIG. 9F, an outflow 218*a* of the cryogenic fluid 82, such as the liquid hydrogen 84, starts to flow from and exit the vacuum cavity 166 through the breach 162 in the vacuum tank wall 64 of the vacuum tank 50, and into the air 78, such as the ambient air 78*a*. Since the pressure tank 80 is pressurized with a pressure greater than the air 78, such as the ambient air 78*a*, the cryogenic fluid 82, such as the liquid hydrogen 84, flows outward into the air 78, such as the ambient air 78*a*, instead of the air 78, such as the ambient air 78*a*, flowing into the vacuum tank 50 and the pressure tank 80. This is important, since it prevents the formation of a mixture forming of liquid air and liquid hydrogen 84, which can be explosive.

As shown in FIG. 9F, the cables 145 and removable plug elements 118 remain in the inactive condition 224 and hang from the central rotatable tube 138 at the bottom area 222 of the pressure tank 80. In the inactive condition 224, the cables 145 and the removable plug elements 118 do not interfere with any outflow 218*a* (see FIG. 9F) of the cryogenic fluid 82, such as the liquid hydrogen 84, out of the breach 162 in the vacuum tank 50.

Figure 9G:
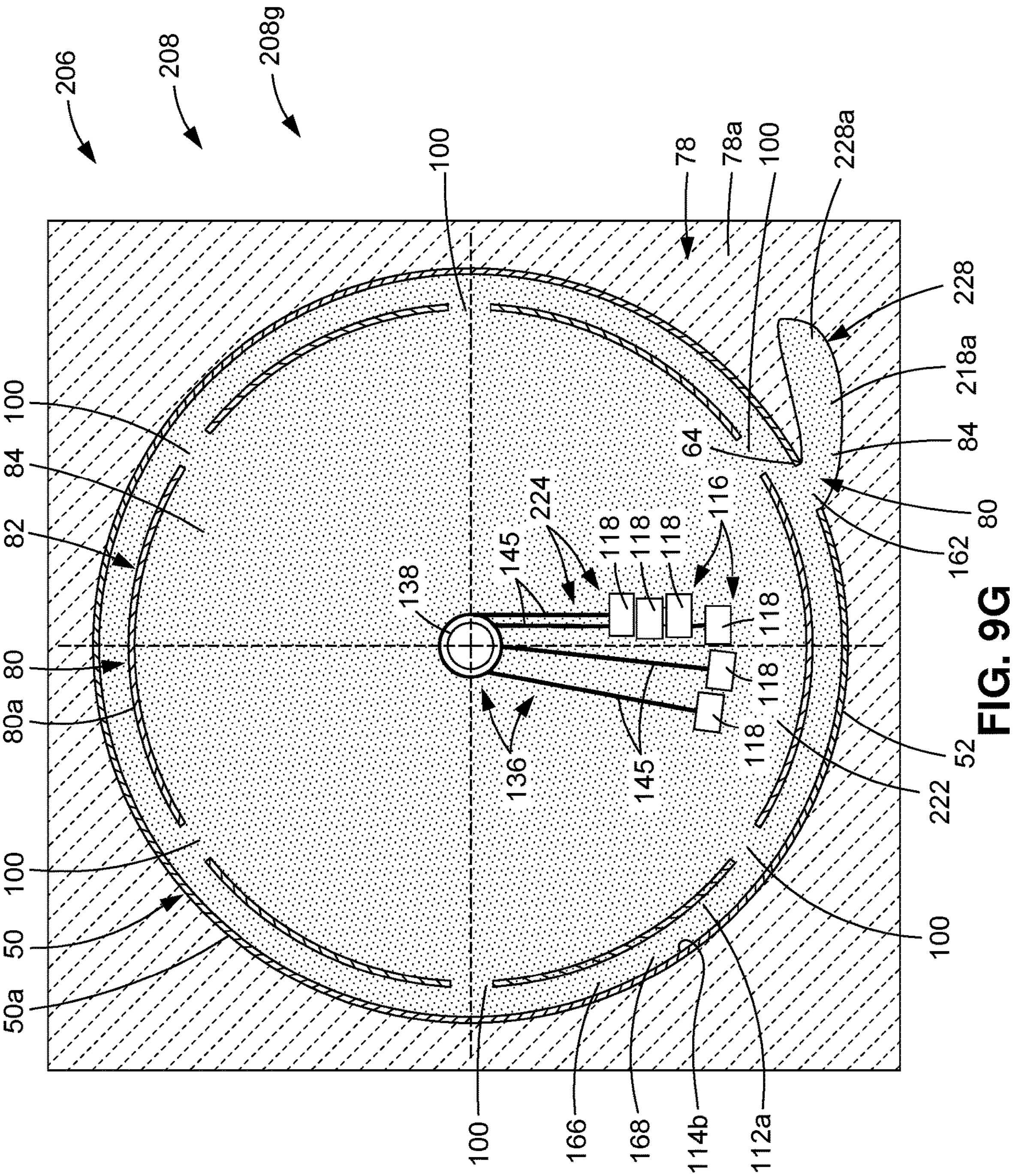
FIG. 9G is an illustration of a cross-sectional front view of the tank system with removable plug assembly of FIG. 9A, showing a seventh position of the removable plug assembly activation sequence.

FIG. 9G is an illustration of a cross-sectional front view of the tank system 10, such as the vacuum jacketed tank system 10*a*, with the removable plug assembly 116 of FIG. 9A, showing a position 208, such as a seventh position 208*g*, of the activation sequence 206. As shown in FIG. 9G, in the seventh position 208*g*, the outflow 218*a* of the cryogenic fluid 82, such as the liquid hydrogen 84, continues to flow from the vacuum cavity 166 through the breach 162 in the vacuum tank wall 64 of the vacuum tank 50, and into the air 78, such as the ambient air 78*a*. FIG. 9G shows the outflow 218*a* of the cryogenic fluid 82, such as the liquid hydrogen 84, in the form of a plume 228, such as a liquid hydrogen plume 228*a*, outside the exterior 52 of the vacuum tank 50. As shown in FIG. 9G, the cables 145 and removable plug elements 118 remain in the inactive condition 224 and hang from the central rotatable tube 138 at the bottom area 222 of the pressure tank 80.

Figure 9H:
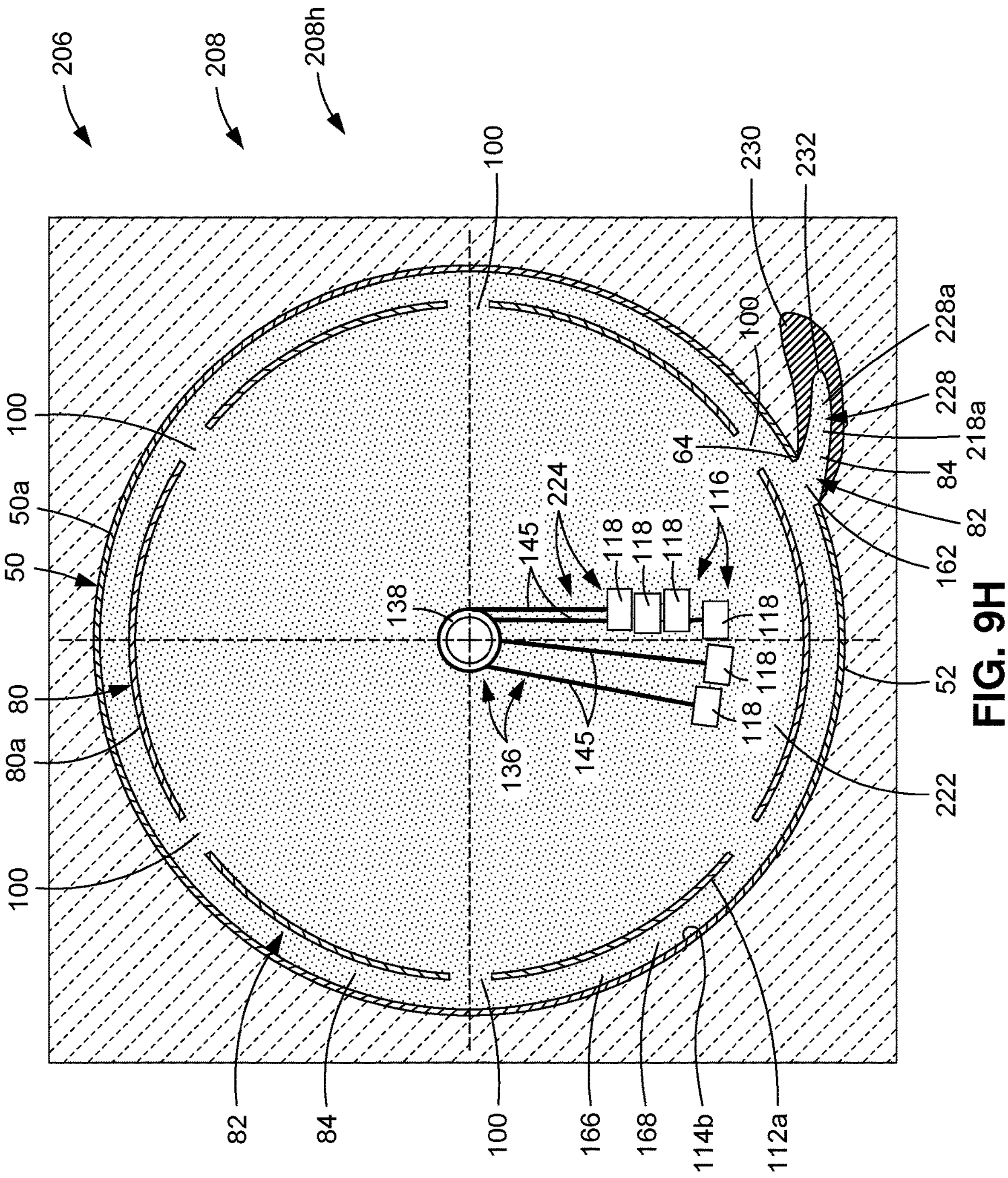
FIG. 9H is an illustration of a cross-sectional front view of the tank system with removable plug assembly of FIG. 9A, showing an eighth position of the removable plug assembly activation sequence.

FIG. 9H is an illustration of a cross-sectional front view of the tank system 10, such as the vacuum jacketed tank system 10*a*, with the removable plug assembly of FIG. 9A, showing a position 208, such as an eighth position 208*h*, of the activation sequence 206. As shown in FIG. 9H, in the eighth position 208*h*, a portion of the plume 228, such as the liquid hydrogen plume 228*a*, is ignited into a flame 230. During the emergency condition 152, such as for the aircraft 14, the emergency landing 154 (see FIG. 2) or the forced landing 155 (see FIG. 2), or another emergency condition 152, if there are any sparks, the plume 228, such as the liquid hydrogen plume 228*a*, may be readily ignited. Also, the plume 228 may ignite on its own, since the activation energy between the liquid hydrogen 84 and air 78 is very low. The liquid hydrogen 84 and air 78 are only mixing on the surface of the plume 228 and they are contained and do not cause an explosive event. Although FIG. 9H shows the plume 228 ignited into the flame 230, the interaction between the liquid hydrogen 84 and air 78 may happen immediately and may be occurring as early as the outflow 218*a* in FIG. 9F. As shown in FIG. 9H, an ignition surface 232 outside of the vacuum tank 50 is a boundary between the plume 228, such as the liquid hydrogen plume 228*a*, and the air 78, such as the ambient air 78*a*. This situation is stable, as it is controlled burning, limited by the amount of air 78, such as ambient air 78*a*, that can come into contract with the plume 228, such as the liquid hydrogen plume 228*a*, in a given amount of time. As long as there is internal pressure in both the vacuum tank 50 and the pressure tank 80, the cryogenic fluid 82, such as the liquid hydrogen 84, will keep flowing outward, thus preventing the air 78, such as the ambient air 78*a*, from entering the vacuum tank 50 and the pressure tank 80, and forming a mixture of liquid air and liquid hydrogen 84. The tank system 10 now acts like a single tank with a double wall with the internal pressure tank 80*a* with many holes and the external vacuum tank 50*a* now acting like the pressure tank 80 with a breach 162 (see FIG. 9H). As shown in FIG. 9H, the cables 145 and removable plug elements 118 remain in the inactive condition 224 and hang from the central rotatable tube 138 at the bottom area 222 of the pressure tank 80.

Figure 10:
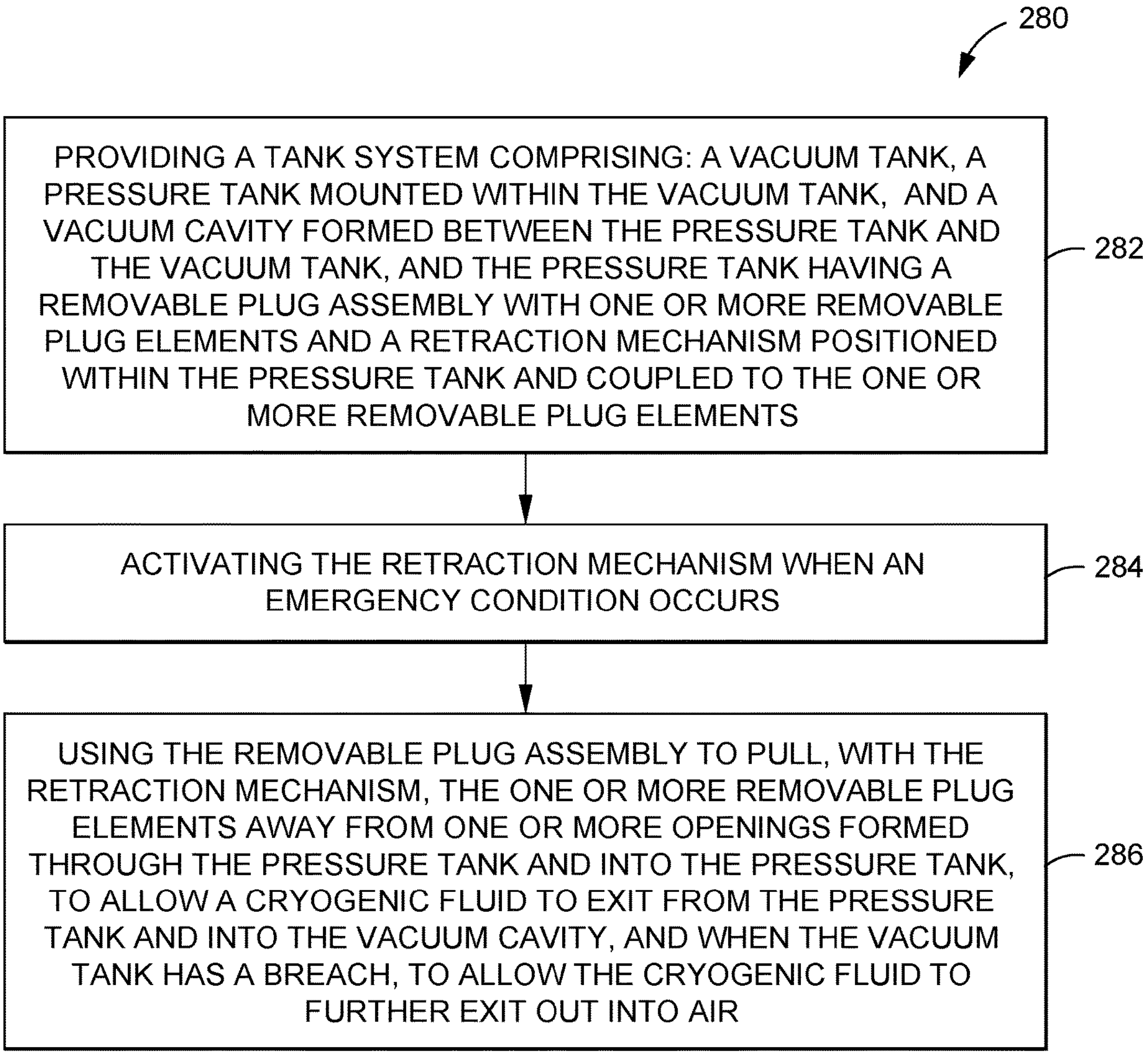
FIG. 10 is an illustration of a flow diagram of an exemplary version of a method of the disclosure.

Now referring to FIG. 10, FIG. 10 is an illustration of a flow diagram of an exemplary version of a method 280 of the disclosure. In another version of the disclosure, there is provided the method 280 of using a tank system 10 having a removable plug assembly 116 (see FIGS. 2, 4A, 5A) to allow a cryogenic fluid 82 (see FIG. 2) to exit in an emergency condition 152 (see FIG. 2).

The blocks in FIG. 10 represent operations and/or portions thereof, or elements, and lines connecting the various blocks do not imply any particular order or dependency of the operations or portions thereof, or elements. FIG. 10 and the disclosure of the steps of the method 280 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 10, the method 280 comprises the step 282 of providing the tank system 10 having the removable plug assembly 116. The tank system 10 comprises a vacuum tank 50 (see FIGS. 2, 3A) having a vacuum tank main portion 56 (see FIGS. 2, 3A) extending between vacuum tank end portions 58 (see FIGS. 2, 3A). The vacuum tank main portion 56 has a vacuum tank skin 60 (see FIGS. 2, 3A). The tank system 10 further comprises a pressure tank 80 (see FIGS. 2, 3B) mounted within the vacuum tank 50. The pressure tank 80 is configured to contain the cryogenic fluid 82. The pressure tank 80 comprises a pressure tank main portion 92 (see FIGS. 2, 3B) extending between pressure tank end portions 94 (see FIGS. 2, 3B). The pressure tank main portion 92 has one or more openings 100 (see FIGS. 2, 4B, 5B) formed through the pressure tank main portion 92. The pressure tank main portion 92 further has the removable plug assembly 116. The removable plug assembly 116 comprises one or more removable plug elements 118 (see FIGS. 2, 4A, 5A). Each of the one or more removable plug elements 118 is configured to plug and to unplug one of the one or more openings 100. The removable plug assembly 116 further comprises a retraction mechanism 136 (see FIGS. 2, 4A, 5A) positioned within an interior 90 (see FIGS. 2, 3B) of the pressure tank 80. The retraction mechanism 136 is coupled to the one or more removable plug elements 118. The tank system 10 further comprises a vacuum cavity 166 (see FIGS. 2, 3B) formed between the exterior 88 and pressure tank outer surface 112*a* (see FIG. 3B) of the pressure tank 80 and the interior 54 and vacuum tank inner surface 114*b* (see FIG. 3B) of the vacuum tank 50.

The step 282 of providing the tank system 10 further comprises, providing the tank system 10 having the removable plug assembly 116 further comprising a plug seal 126 (see FIGS. 2, 4B) coupled to each of the one or more removable plug elements 118 at the one or more openings 100, and further comprising, a membrane seal 132 (see FIGS. 2, 5B) positioned over a second portion 122, such as an inner portion 122*a*, (see FIG. 5B) of each of the one or more removable plug elements 118, and coupled to locations 130*b* (see FIG. 5B) on a pressure tank inner surface 112*b* (see FIG. 5B) of the pressure tank 80.

The step 282 of providing the tank system 10 further comprises, providing the tank system 10 having the removable plug assembly 116 in an aircraft 14 (see FIGS. 1, 2), and filling the pressure tank 80 with the cryogenic fluid 82 comprising one of, liquid hydrogen 84 (see FIG. 2), liquid natural gas 86 (see FIG. 2), or another suitable cryogenic fluid.

As shown in FIG. 10, the method 280 further comprises the step 284 of activating the retraction mechanism 136 when the emergency condition 152 occurs. The step 284 of activating the retraction mechanism 136 may further comprise, activating the retraction mechanism 136 when the emergency condition 152 occurs comprising one of, as shown in FIG. 2, an emergency landing 154 of the aircraft 14, a forced landing 155 of the aircraft 14, the pressure tank 80 experiencing an elevated acceleration level 156 of acceleration 157 of the aircraft 14, the pressure tank 80 experiencing an elevated force level 158 of force 159, and an event 160 causing a breach 162 or a potential breach 162*a* of the vacuum tank 50, and/or causing an airflow 164 or a potential airflow 164*a* of the air 78, such as the ambient air 78*a*, into the pressure tank 80. The step 284 of activating the retraction mechanism 136 further comprises, rotating, with an actuator 144 (see FIGS. 2, 3B), a central rotatable tube 138 (see FIGS. 2, 3B), to cause one or more cables 145 (see FIGS. 2, 3B) attached to the central rotatable tube 138 and attached to the one or more removable plug elements 118, to wind partially or fully around the central rotatable tube 138, and to pull the one or more removable plug elements 118 away from the one or more openings 100 (see FIGS. 2, 3B), so that the one or more removable plug elements 118 are released from the one or more openings 100.

The step 284 of activating the retraction mechanism 136 further comprises, activating the retraction mechanism 136 with an activation system 150 (see FIG. 2) comprising one of, an automatic activated activation system 150*a* (see FIG. 2), or an operator activated activation system 150*b*, such as a pilot activated activation system 150*c* (see FIG. 2), when the structure 12 comprises an aircraft 14.

As shown in FIG. 10, the method 280 further comprises the step 286 of using the removable plug assembly 116 of the tank system 10 to pull, with the retraction mechanism 136, the one or more removable plug elements 118 away from the one or more openings 100 and into the interior 90 of the pressure tank 80, to allow the cryogenic fluid 82 to exit and to flow from the pressure tank 80, through the one or more openings 100, and into the vacuum cavity 166, and when the vacuum tank 50 has a breach 162, to allow the cryogenic fluid 82 to further exit and flow out into air 78, such as the ambient air 78*a*.

Figure 11:
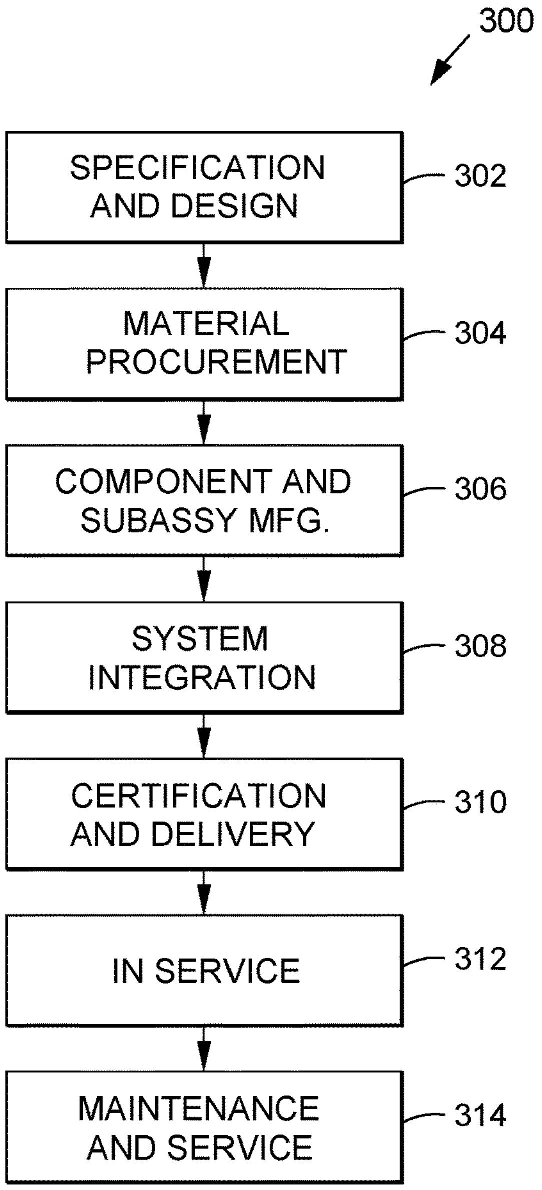
FIG. 11 is an illustration of a flow diagram of an exemplary aircraft manufacturing and service method.
Figure 12:
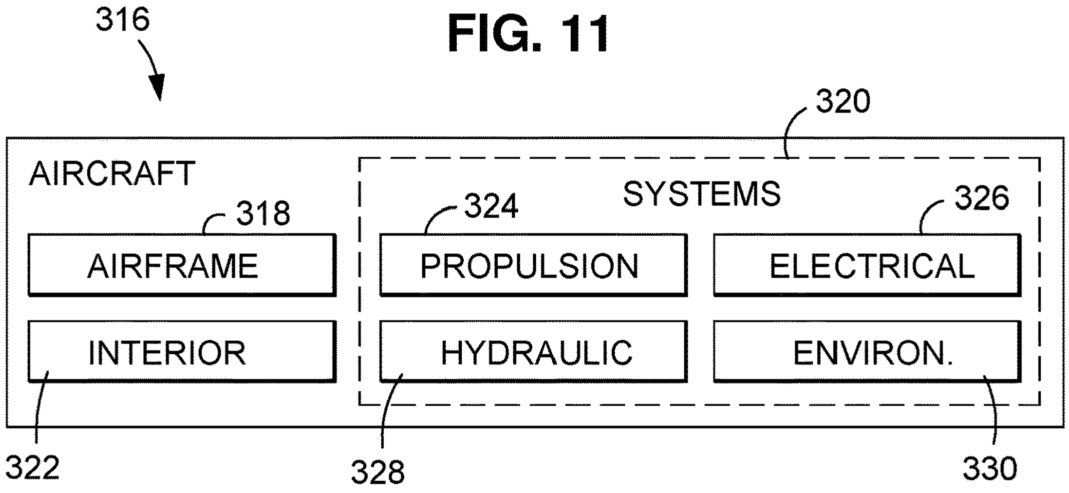
FIG. 12 is an illustration of an exemplary block diagram of an aircraft.

Now referring to FIGS. 11 and 12, FIG. 11 is an illustration of a flow diagram of an exemplary aircraft manufacturing and service method 300, and FIG. 12 is an illustration of an exemplary block diagram of an aircraft 316. Referring to FIGS. 11 and 12, versions of the disclosure may be described in the context of the aircraft manufacturing and service method 300 as shown in FIG. 11, and the aircraft 316 as shown in FIG. 12.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 12, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry, the construction industry, or another suitable industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the tank system 10 (see FIGS. 2, 3A-3B, 4A-9A), the aircraft 14 (see FIG. 1) with the tank system 10, and the method 280 (see FIG. 10) of using the tank system 10 provide a tank system 10 having a removable plug assembly 116 (see FIGS. 2, 3B, 4A-9A) to allow a cryogenic fluid 82 (see FIGS. 2, 9A), such as liquid hydrogen 84 (see FIGS. 2, 9A) or liquid natural gas 86 (see FIG. 2) to exit the tank system 10 in an emergency condition 152 (see FIG. 2). The tank system 10, such as the vacuum jacketed tank system 10*a* (see FIGS. 2, 3A-3B, 4A-9A), comprises the vacuum tank 50 (see FIGS. 3A-3B), such as the external vacuum tank 50*a* (see FIGS. 3A-3B), the pressure tank 80 (see FIG. 3B), such as the internal pressure tank 80*a* (see FIG. 3B), mounted within the vacuum tank 50, and the vacuum cavity 166 (see FIG. 3B) and the gap 168 (see FIG. 3B) formed between the vacuum tank inner surface 114*b* (see FIG. 3B) of the vacuum tank 50 and the pressure tank outer surface 112*a* (see FIG. 3B) of the pressure tank 80.

The pressure tank 80 is configured with the removable plug assembly 116 (see FIGS. 2, 3B, 4A-9A) having one or more removable plug elements 118 (see FIGS. 2, 3B, 4A-9A) that are retracted or pulled away from one or more openings 100 (see FIGS. 2, 3B, 4A-9A) formed in the pressure tank 80 by a retraction mechanism 136, when the retraction mechanism 136 is activated by an activation system 150 (see FIG. 2) upon the occurrence of an emergency condition 152 (see FIG. 2). In one version, the retraction mechanism 136 comprises a central rotatable tube 138 within the interior 90 of the pressure tank 80 that is actuated by an actuator 144 (see FIGS. 2, 3B), and comprises one or more cables 145 attached to the central rotatable tube 138 and attached to the removable plug elements 118. The removable plug elements 118 are quickly removed from the openings 100 The quick removal or release of the removable plug elements 118 from the openings 100 allows the rapid outflow 218 (see FIG. 9B) of the cryogenic fluid 82 (see FIGS. 2, 9A), such as liquid hydrogen 84 (see FIGS. 2, 9A), liquid natural gas 86 (see FIG. 2), or another suitable cryogenic fluid from the pressure tank 80 to the vacuum cavity 166. The removable plug elements 118 prevent the escape of the cryogenic fluid 82 (see FIGS. 2, 9A), such as liquid hydrogen 84 (see FIGS. 2, 9A) or liquid natural gas 86 (see FIG. 2) from the pressure tank 80 during normal conditions. Alternative to the removable plug assembly 116, the pressure tank 80, such as the internal pressure tank 80*a*, may be configured with the valve assembly 134 (see FIG. 2) having the valves 135 (see FIG. 2) that are quick to open, to allow the rapid flow of cryogenic fluid 82, such as liquid hydrogen 84 or liquid natural gas 86, from the pressure tank 80 to the vacuum cavity 166.

The vacuum tank 50, such as the external vacuum tank 50*a*, provides a barrier 214 (see FIG. 9A) between the ambient air 78*a* and the vacuum cavity 166. The vacuum tank 50, such as the external vacuum tank 50*a*, is designed to withstand the external pressure loading which is a result of the pressure of the ambient air 78*a* acting on the vacuum tank outer surface 114*a* of the vacuum tank 50, and nothing acting on the vacuum tank inner surface 114*b* of the vacuum tank 50.

The vacuum cavity 166 (see FIGS. 3B, 4A-9A) formed around the pressure tank 80 provides an area for the air 78, such as the ambient air 78*a*, to flow into and liquefy, should the vacuum tank 50 be breached with a breach 162 (see FIG. 1), such as a puncture or rupture. The vacuum cavity 166 limits the thermal transfer between the cryogenic fluid 82, such as the liquid hydrogen 84 or the liquid natural gas 86, and the air 78, such as the ambient air 78*a*. When the pressure tank 80 and the vacuum tank 50 are breached, the cryogenic fluid 82, such as the liquid hydrogen 84 or the liquid natural gas 86, flows from the pressure tank 80 through the vacuum tank 50 and out into the air 78, such as the ambient air 78*a*. Since the pressure tank 80 is pressurized with a pressure greater than the ambient air 78*a*, the cryogenic fluid 82, such as the liquid hydrogen 84 or the liquid natural gas 86, flows outward into the ambient air 78*a*, instead of the air 78, such as the ambient air 78*a* flowing into the pressure tank 80. This prevents the formation of a mixture forming of the liquid air and the liquid hydrogen 84 or liquid natural gas 86, which can be explosive.

Further, disclosed versions of the tank system 10 (see FIGS. 2, 3A-3B, 4A-9A), the aircraft 14 (see FIG. 1) with the tank system 10, and the method 280 (see FIG. 10) of using the tank system 10 provide for additional sealing capability of the removable plug elements 118 at the openings 100. For example, the tank system 10 may optionally comprise a plug seal 126 (see FIGS. 2, 4B), such as an O-ring, a gasket, or another suitable plug seal member coupled to each removable plug element 118 at the each opening 100. In addition, a sealant 128 (see FIG. 4B), such as an adhesive sealant, may be applied to one or more surfaces of the plug seal 126 (see FIG. 4B) and/or applied to one or more locations 130*a* (see FIG. 4B) on the pressure tank inner surface 112*b* at the opening 100, to further seal at the opening 100 and at the removable plug element 118 contacting the opening 100. Moreover, the tank system 10 may optionally further comprise a membrane seal 132 used in conjunction with, or instead of, the plug seal 126. The membrane seal 132 is positioned over the removable plug element 118, over the plug seal 126, and is coupled to locations 130*b* (see FIG. 5B) on the pressure tank inner surface 112*b* (see FIG. 5B). The membrane seal 132 is coupled to the pressure tank inner surface 112*b* (see FIG. 5B) with one or more attachment elements. The membrane seal 132, such as an aluminum foil, is configured to be torn to allow the removable plug element 118 to be pulled through the membrane seal 132, when the removable plug element 118 is released from the opening 100.

In addition, disclosed versions of the tank system 10 (see FIGS. 2, 3A-3B, 4A-9A), the aircraft 14 (see FIG. 1) with the tank system 10, and the method 280 (see FIG. 10) of using the tank system 10 solve the problem of, when there is a breach 162 (see FIG. 2) or rupture in the external vacuum tank 50*a* and the internal pressure tank 80*a* of a vacuum jacketed tank system 10*a*, preventing the air 78, such as the ambient air 78*a*, outside of the vacuum jacketed tank system 10*a* from entering the external vacuum tank 50*a* and the vacuum cavity 166, liquefying, and mixing with the cryogenic fluid 82 from the internal pressure tank 80*a*. The improved tank system 10, such as the vacuum jacketed tank system 10*a*, and method 280 of using the same, prevent or avoid a potential explosive situation should the vacuum jacketed tank system 10*a* be breached in an emergency condition 152. In addition, the improved tank system 10, such as the vacuum jacketed tank system 10*a*, and method 280 of using the same enhance the safety of vacuum jacketed liquid hydrogen tanks or liquid natural gas tanks, for example, the internal pressure tank 80*a* containing the cryogenic fluid 82, such as liquid hydrogen 84 or liquid natural gas 86. Further, the improved tank system 10, such as the vacuum jacketed tank system 10*a*, and method 280 of using the same mitigate a safety concern for vacuum jacketed tank system certification. Upon the occurrence of the emergency condition 152, or emergency situation, the activation system 150 (see FIG. 2) activates the retraction mechanism 136. The activation system 150 may be an automatic activated activation system 150*a* (see FIG. 2) that is automatically activated by the emergency condition 152, or the activation system 150 may be an operator activated activation system 150*b* (see FIG. 2) that is activated by an operator of the structure 12 (see FIG. 2), such as a pilot of an aircraft 14 (see FIG. 2). The emergency condition 152, or emergency situation, means there is an increased probability that the vacuum tank 50 might be breached or ruptured, so that air 78, such as ambient air 78*a*, outside of the vacuum tank 50, for example, a vacuum tank 50 of an aircraft 14, flows into the vacuum tank 50. If the air 78, such as the ambient air 78*a*, somehow mixes with the cryogenic fluid 82 (see FIGS. 2, 9A), such as liquid hydrogen 84 (see FIGS. 2, 9A) or liquid natural gas 86 (see FIG. 2), acting as fuel, in the pressure tank 80, for example, when it is subsequently breached, or there is leakage, the resulting mixture is highly explosive, with a very low activation energy. For example, just slightly jostling a container of such a mixture of liquid hydrogen 84 and air 78 may cause it to explode.

The emergency condition 152 comprises one or more of, an emergency landing 154 of the aircraft 14, when the structure 12 comprises an aircraft 14, a forced landing 155 of the aircraft 14, when the structure 12 comprises an aircraft 14, the pressure tank 80 experiencing an elevated acceleration level 156 of acceleration 157, or high acceleration, of the aircraft 14, when the structure 12 comprises an aircraft 14, the pressure tank 80 experiencing an elevated force level 158 of force 159, or high force, an event 160 causing a breach 162 or a potential breach 162*a* of the vacuum tank 50, and/or an airflow 164 or a potential airflow 164*a* of the air 78, such as the ambient air 78*a*, into the pressure tank 80, or another type of emergency condition experienced by the structure 12, for example, the aircraft 14. An elevated force level 158 may include projectiles, such as bullets, or missiles, or other types of projectiles, being fired at the vacuum tank 50 and/or the pressure tank 80. The removable plug assembly 116 of the tank system 10 allows the cryogenic fluid 82, such as the liquid hydrogen 84 or the liquid natural gas 86, to exit or escape from the pressure tank 80 in the emergency condition 152 to fill the vacuum cavity 166 so that if there is a breach 162 of the vacuum tank 50, the outside air 78, such as the ambient air 78*a*, outside the vacuum tank 50, cannot flow into the vacuum cavity 166 as it is already filled with the escaped cryogenic fluid 82, such as the liquid hydrogen 84 or the liquid natural gas 86.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A tank system having a removable plug assembly, the tank system comprising:

- a vacuum tank having a vacuum tank main portion extending between vacuum tank end portions, the vacuum tank main portion having a vacuum tank skin;
- a pressure tank mounted within the vacuum tank, the pressure tank configured to contain a cryogenic fluid and comprising:
  - a pressure tank main portion extending between pressure tank end portions, the pressure tank main portion having one or more openings formed through the pressure tank main portion; and
  - the removable plug assembly comprising:
    - one or more removable plug elements, each configured to plug and to unplug one of the one or more openings; and
    - a retraction mechanism positioned within an interior of the pressure tank, the retraction mechanism coupled to the one or more removable plug elements; and
- a vacuum cavity formed between an exterior of the pressure tank and an interior of the vacuum tank, wherein when an emergency condition occurs, the retraction mechanism is activated to pull the one or more removable plug elements away from the one or more openings and into the interior of the pressure tank, to allow the cryogenic fluid to exit and to flow from the pressure tank, through the one or more openings, and into the vacuum cavity, and when the vacuum tank has a breach, to allow the cryogenic fluid to further exit and flow out into air.

2. The tank system of claim 1, further comprising one or more of,

- a plug seal coupled to each of the one or more removable plug elements at the one or more openings, and
- a membrane seal positioned over an inner portion of each of the one or more removable plug elements, and coupled to a pressure tank inner surface.

3. The tank system of claim 1, wherein the cryogenic fluid comprises one of:

liquid hydrogen; or liquid natural gas.

4. The tank system of claim 1, wherein each of the one or more openings has a circular shape, and a diameter with a length in a range of from 1 inch to 12 inches.

5. The tank system of claim 1, wherein each of the one or more removable plug elements is made of a material comprising:

a metal material including stainless steel, aluminum alloy, titanium alloy, copper, or copper alloy;

a polymer material including thermoplastic, polytetrafluoroethylene (PTFE), polyetheretherketone (PEEK), high density polyethylene, polyamide, elastomer, or rubber; or a composite material including carbon fiber reinforced polymer (CFRP).

6. The tank system of claim 1, wherein the one or more removable plug elements comprise a number in a range of one removable plug element to six removable plug elements.

7. The tank system of claim 1, wherein the retraction mechanism comprises:

a central rotatable tube;

an actuator coupled to the central rotatable tube and configured to rotate the central rotatable tube; and one or more cables attached to the central rotatable tube, each of the one or more cables having a first end attached to the central rotatable tube, and having a second end attached to one of the one or more removable plug elements.

8. The tank system of claim 7, wherein the retraction mechanism further comprises a safety lock mechanism to provide unintended operation prevention of the removable plug assembly.

9. The tank system of claim 1, wherein when the emergency condition occurs, the retraction mechanism is activated with an activation system comprising one of:

an automatic activated activation system; or an operator activated activation system.

10. The tank system of claim 1, wherein the vacuum tank further comprises one or more blowout panels formed in a vacuum tank wall of the vacuum tank.

11. An aircraft, comprising:

a fuselage with a plurality of fuselage barrel sections, and an outer aero skin at a fuselage mold line; and a tank system having a removable plug assembly, the tank system comprising:

a vacuum tank having a vacuum tank main portion extending between vacuum tank end portions, the vacuum tank main portion having a vacuum tank skin;

a pressure tank mounted within the vacuum tank, the pressure tank configured to contain a cryogenic fluid and comprising:

a pressure tank main portion extending between pressure tank end portions, the pressure tank main portion having one or more openings formed through the pressure tank main portion; and the removable plug assembly comprising:

one or more removable plug elements, each configured to plug and to unplug one of the one or more openings; and a retraction mechanism positioned within an interior of the pressure tank, the retraction mechanism coupled to the one or more removable plug elements; and a vacuum cavity formed between an exterior of the pressure tank and an interior of the vacuum tank, wherein when an emergency condition occurs, the retraction mechanism is activated to pull the one or more removable plug elements away from the one or more openings and into the interior of the pressure tank, to allow the cryogenic fluid to exit and to flow from the pressure tank, through the one or more openings, and into the vacuum cavity, and when the vacuum tank has a breach, to allow the cryogenic fluid to further exit and flow out into air.

12. The aircraft of claim 11, wherein the pressure tank of the tank system further comprises one or more of:

a plug seal coupled to each of the one or more removable plug elements at the one or more openings, and a membrane seal positioned over an inner portion of each of the one or more removable plug elements, and coupled to a pressure tank inner surface.

13. The aircraft of claim 11, wherein the emergency condition comprises one of:

an emergency landing of the aircraft;

a forced landing of the aircraft;

the pressure tank experiencing an elevated acceleration level of the aircraft;

the pressure tank experiencing an elevated force level; and an event causing the breach, or a potential breach, of the vacuum tank and causing an airflow, or a potential airflow, of the air into the pressure tank.

14. The aircraft of claim 11, wherein when the emergency condition occurs, the retraction mechanism is activated with an activation system comprising one of:

an automatic activated activation system; or a pilot activated activation system.

15. A method of using a tank system having a removable plug assembly to allow a cryogenic fluid to exit in an emergency condition, the method comprising the steps of:

providing the tank system having the removable plug assembly, the tank system comprising:

a vacuum tank having a vacuum tank main portion extending between vacuum tank end portions, the vacuum tank main portion having a vacuum tank skin;

a pressure tank mounted within the vacuum tank, the pressure tank configured to contain the cryogenic fluid and comprising:

a pressure tank main portion extending between pressure tank end portions, the pressure tank main portion having one or more openings formed through the pressure tank main portion; and the removable plug assembly comprising:

one or more removable plug elements, each configured to plug and to unplug one of the one or more openings; and a retraction mechanism positioned within an interior of the pressure tank, the retraction mechanism coupled to the one or more removable plug elements; and a vacuum cavity formed between an exterior of the pressure tank and an interior of the vacuum tank;

activating the retraction mechanism when the emergency condition occurs; and using the removable plug assembly of the tank system to pull, with the retraction mechanism, the one or more removable plug elements away from the one or more openings and into the interior of the pressure tank, to allow the cryogenic fluid to exit and to flow from the pressure tank, through the one or more openings, and into the vacuum cavity, and when the vacuum tank has a breach, to allow the cryogenic fluid to further exit and flow out into air.

16. The method of claim 15, wherein the step of providing the tank system further comprises, providing the tank system having the removable plug assembly further comprising:

a plug seal coupled to each of the one or more removable plug elements at the one or more openings, and a membrane seal positioned over an inner portion of each of the one or more removable plug elements, and coupled to a pressure tank inner surface.

17. The method of claim 15, wherein the step of providing the tank system further comprises, providing the tank system having the removable plug assembly in an aircraft, and filling the pressure tank with the cryogenic fluid comprising one of, liquid hydrogen, or liquid natural gas.

18. The method of claim 17, wherein the step of activating the retraction mechanism further comprises, activating the retraction mechanism when the emergency condition occurs comprising one of:

an emergency landing of the aircraft;

a forced landing of the aircraft;

the pressure tank experiencing an elevated acceleration level of the aircraft;

the pressure tank experiencing an elevated force level; and an event causing the breach, or a potential breach, of the vacuum tank and causing an airflow, or a potential airflow, of the air into the pressure tank.

19. The method of claim 15, wherein the step of activating the retraction mechanism further comprises:

rotating, with an actuator, a central rotatable tube, to cause one or more cables attached to the central rotatable tube and attached to the one or more removable plug elements, to wind around the central rotatable tube, and to pull the one or more removable plug elements away from the one or more openings.

20. The method of claim 15, wherein the step of activating the retraction mechanism further comprises:

activating the retraction mechanism with an activation system comprising one of, an automatic activated activation system, or an operator activated activation system.

* * * * *